(12) United States Patent
Yoon et al.

(10) Patent No.: US 12,200,659 B2
(45) Date of Patent: Jan. 14, 2025

(54) METHOD FOR TRANSMITTING AND RECEIVING UPLINK REFERENCE SIGNAL FOR POSITIONING, AND DEVICE THEREFOR

(71) Applicant: LG Electronics Inc., Seoul (KR)

(72) Inventors: Sukhyon Yoon, Seoul (KR); Hyunsoo Ko, Seoul (KR); Hyunsu Cha, Seoul (KR); Hanbyul Seo, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/286,241

(22) PCT Filed: Nov. 7, 2019

(86) PCT No.: PCT/KR2019/015060
§ 371 (c)(1),
(2) Date: Apr. 16, 2021

(87) PCT Pub. No.: WO2020/101266
PCT Pub. Date: May 22, 2020

(65) Prior Publication Data
US 2021/0352613 A1  Nov. 11, 2021

(30) Foreign Application Priority Data

Nov. 12, 2018  (KR) .......................... 10-2018-0138191
Jan. 8, 2019  (KR) .......................... 10-2019-0002052

(51) Int. Cl.
*H04W 64/00* (2009.01)
*H04L 5/00* (2006.01)
(Continued)

(52) U.S. Cl.
CPC ......... *H04W 64/006* (2013.01); *H04L 5/0051* (2013.01); *H04W 52/143* (2013.01); *H04W 52/242* (2013.01); *H04W 56/001* (2013.01)

(58) Field of Classification Search
CPC ............. H04W 64/006; H04W 52/143; H04W 52/242; H04W 56/001; H04W 52/16;
(Continued)

(56) References Cited

U.S. PATENT DOCUMENTS

2017/0245220 A1    8/2017  Ouchi et al.
2017/0264402 A1*   9/2017  Papasakellariou .... H04W 52/36
(Continued)

FOREIGN PATENT DOCUMENTS

EP       2950595       12/2015
WO     WO2012177207    12/2012
(Continued)

OTHER PUBLICATIONS

Extended European Search Report in European Appln. No. 19885930.8, dated Nov. 10, 2021, 5 pages.
(Continued)

*Primary Examiner* — Kabir A Timory
(74) *Attorney, Agent, or Firm* — Fish & Richardson P.C.

(57) ABSTRACT

A method by which a terminal transmits, in a wireless communication system, a reference signal for positioning is disclosed. Particularly, the disclosure can comprise: receiving information related to a cell list including at least one cell; receiving one or more downlink signals from the at least one cell; determining the transmission power of the reference signal on the basis of the reception power of a specific downlink signal from among the one or more downlink signals; and transmitting the reference signal on the basis of the transmission power.

8 Claims, 24 Drawing Sheets

(51) Int. Cl.
*H04W 52/14* (2009.01)
*H04W 52/24* (2009.01)
*H04W 56/00* (2009.01)

(58) Field of Classification Search
CPC ............. H04W 52/245; H04W 52/283; H04W 52/146; H04W 52/325; H04L 5/0051; H04L 5/0023; H04L 5/0032; H04L 5/0048; H04L 5/0092; H04L 27/2613; H04B 17/27
See application file for complete search history.

(56) References Cited

U.S. PATENT DOCUMENTS

| | | | |
|---|---|---|---|
| 2018/0092008 A1* | 3/2018 | Benjebbour | H04W 36/0061 |
| 2018/0167895 A1 | 6/2018 | Lee et al. | |
| 2018/0324771 A1 | 11/2018 | Hosseini et al. | |
| 2019/0053071 A1* | 2/2019 | Ly | H04W 52/242 |
| 2020/0052850 A1* | 2/2020 | Yuan | H04L 5/0048 |
| 2021/0337496 A1* | 10/2021 | Da | H04W 56/005 |

FOREIGN PATENT DOCUMENTS

| | | |
|---|---|---|
| WO | WO2016155775 | 10/2016 |
| WO | WO2018149481 | 8/2018 |

OTHER PUBLICATIONS

Intel Corporation, "Techniques for NR Positioning," R1-1810801, 3GPP TSG RAN WG1 Meeting #94bis, Chengdu, China, dated Oct. 8-12, 2018, 14 pages.

Catt, "Discussion of Potential Techniques for NR Positioning," R1-1812615, 3GPP TSG RAN WG1 Meeting #95, Spokane, USA, dated Nov. 12-16, 2018, 15 pages.

Qualcomm Incorporated, "Combined Downlink and Uplink NR Positioning Procedures," R2-1817899, 3GPP TSG-RAN WG2 Meeting #104, Spokane, USA, dated Nov. 12-16, 2018, 20 pages.

PCT International Search Report and Written Opinion in International Appln. No. PCT/KR2019/015060, dated Feb. 27, 2020, 15 pages (with English translation).

Office Action in European Appln. No. 19885930.8, dated Jul. 12, 2022, 4 pages.

* cited by examiner (A) CONTROL-PLANE PROTOCOL STACK (B) USER-PLANE PROTOCOL STACK (a)

(b)

(a)

(b)

METHOD FOR TRANSMITTING AND RECEIVING UPLINK REFERENCE SIGNAL FOR POSITIONING, AND DEVICE THEREFOR

CROSS-REFERENCE TO RELATED APPLICATIONS

This application is a National Stage application under 35 U.S.C. § 371 of International Application No. PCT/KR2019/015060, filed on Nov. 7, 2019, which claims the benefit of Korean Application No. 10-2019-0002052, filed on Jan. 8, 2019, and Korean Application No. 10-2018-0138191, filed on Nov. 12, 2018. The disclosures of the prior applications are incorporated by reference in their entirety.

TECHNICAL FIELD

The present disclosure relates to a method of transmitting and receiving an uplink reference signal for positioning and device therefor and, more particularly, to a method of determining the structure/timing advance (TA)/power of an uplink reference signal for positioning and transmitting the uplink reference signal based thereon and device therefor.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

The object of the present disclosure is to provide a method of transmitting and receiving an uplink reference signal for positioning and device therefor It will be appreciated by persons skilled in the art that the objects that could be achieved with the present disclosure are not limited to what has been particularly described hereinabove and the above and other objects that the present disclosure could achieve will be more clearly understood from the following detailed description.

In one aspect of the present disclosure, a method of transmitting a reference signal for positioning by a user equipment (UE) in a wireless communication system is provided. The method may include: receiving information about a cell list including at least one cell; receiving one or more downlink signals from the at least one cell; determining transmission power of the reference signal based on reception power of a specific downlink signal among the one or more downlink signals; and transmitting the reference signal with the transmission power.

The specific downlink signal may be a downlink signal having lowest reception power among the one or more downlink signals.

The specific downlink signal may be a downlink signal having lowest reception power among downlink signals having reception power within a threshold from a downlink signal having highest reception power among the one or more downlink signals.

The at least one cell may be a cell related to a transmission beam for transmitting the reference signal.

The reference signal may include an uplink positioning reference signal (UL-PRS) or a sounding reference signal (SRS).

The one or more downlink signals may include at least one of a downlink positioning reference signal (DL-PRS) or a synchronization signal block (SSB).

The UE may be capable of communicating with at least one of another UE other than the UE, a network, a base station, or an autonomous driving vehicle.

In another aspect of the present disclosure, a UE for transmitting a reference signal for positioning in a wireless communication system is provided. The UE may include: at least one transceiver; at least one processor; and at least one memory operably connected to the at least one processor and configured to store instructions that, when executed, cause the at least one processor to perform operations including: receiving information about a cell list including at least one cell through the at least one transceiver; receiving one or more downlink signals from the at least one cell through the at least one transceiver; determining transmission power of the reference signal based on reception power of a specific downlink signal among the one or more downlink signals; and transmitting the reference signal with the transmission power through the at least one transceiver.

The specific downlink signal may be a downlink signal having lowest reception power among the one or more downlink signals.

The specific downlink signal may be a downlink signal having lowest reception power among downlink signals having reception power within a threshold from a downlink signal having highest reception power among the one or more downlink signals.

The at least one cell may be a cell related to a transmission beam for transmitting the reference signal.

The reference signal may include a UL-PRS or an SRS.

The one or more downlink signals may include at least one of a DL-PRS or an SSB.

The UE may be capable of communicating with at least one of another UE other than the UE, a network, a base station, or an autonomous driving vehicle.

In a further aspect of the present disclosure, a device for transmitting a reference signal for positioning in a wireless communication system is provided. The device may include: at least one processor; and at least one memory operably connected to the at least one processor and configured to store instructions that, when executed, cause the at least one processor to perform operations including: receiving information about a cell list including at least one cell; receiving one or more downlink signals from the at least one cell; determining transmission power of the reference signal based on reception power of a specific downlink signal among the one or more downlink signals; and transmitting the reference signal with the transmission power.

According to the present disclosure, positioning accuracy may be improved by determining a timing advance (TA) and power optimized for an uplink reference signal to be received by a plurality of cells.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

Figure 1:
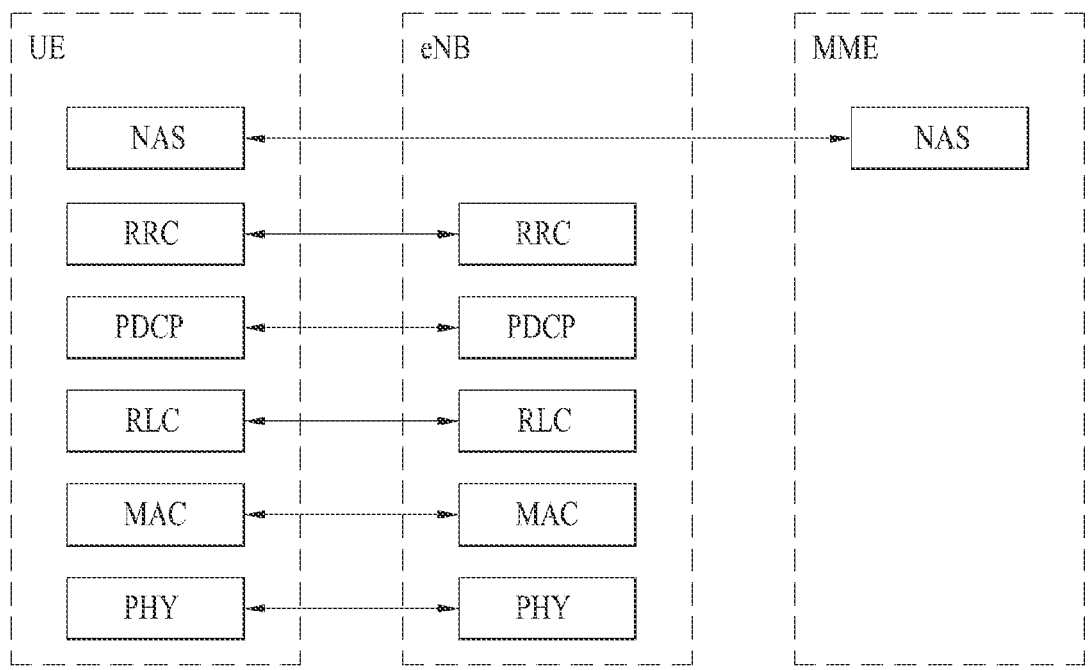
FIG. 1 is a diagram illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard.
Figure 1:
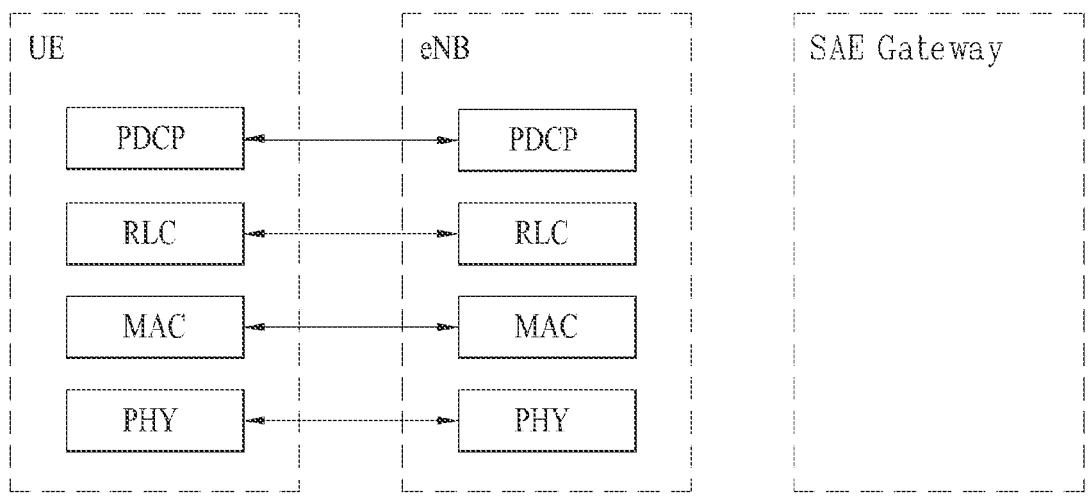

The configuration, operation, and other features of the present disclosure will readily be understood with embodiments of the present disclosure described with reference to the attached drawings. Embodiments of the present disclosure as set forth herein are examples in which the technical features of the present disclosure are applied to a $3^{rd}$ generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
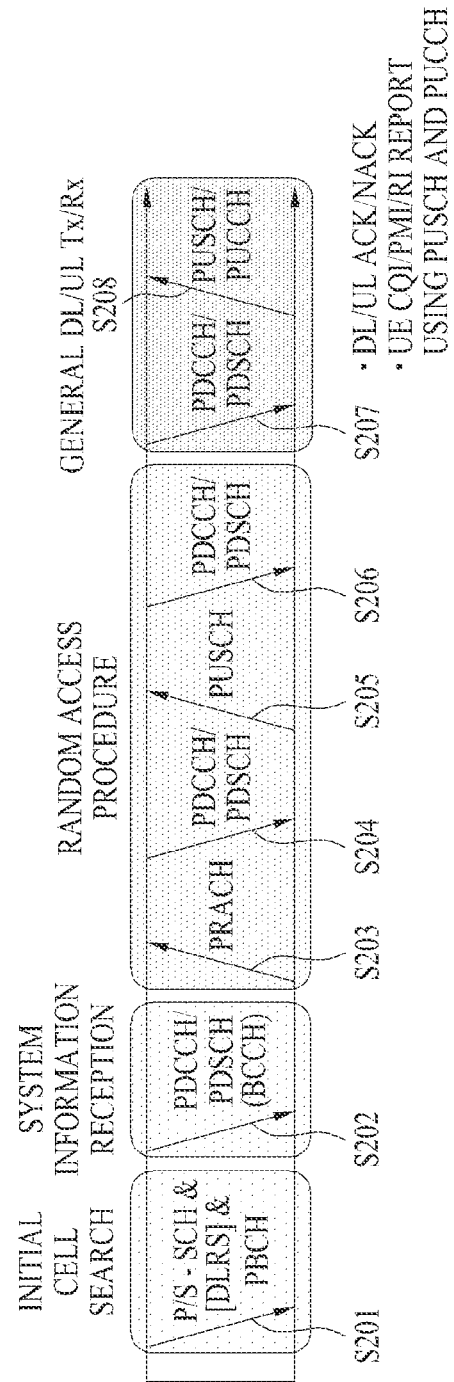
FIG. 2 is a diagram illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

The NR system adopts the OFDM transmission scheme or a similar transmission scheme. Specifically, the NR system may use OFDM parameters different from those in LTE. Further, the NR system may follow the legacy LTE/LTE-A numerology but have a larger system bandwidth (e.g., 100 MHz). Further, one cell may support a plurality of numerologies in the NR system. That is, UEs operating with different numerologies may coexist within one cell.

Figure 3:
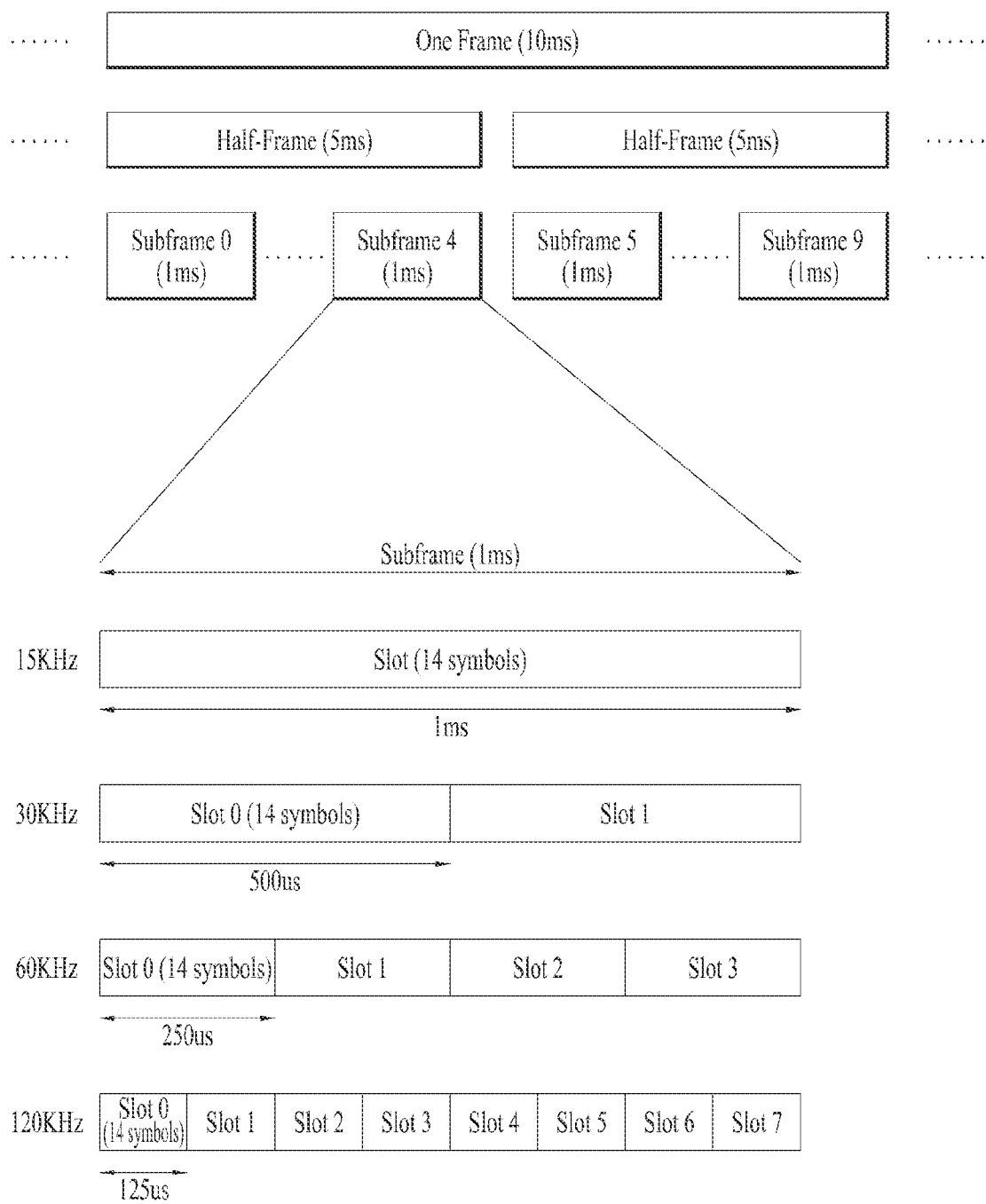
FIGS. 3, 4 and 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: Number of symbols in a slot
*$N^{frame, u}_{slot}$: Number of slots in a frame
*$N^{subframe, u}_{slot}$: Number of slots in a subframe

[Table 2] illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 4:
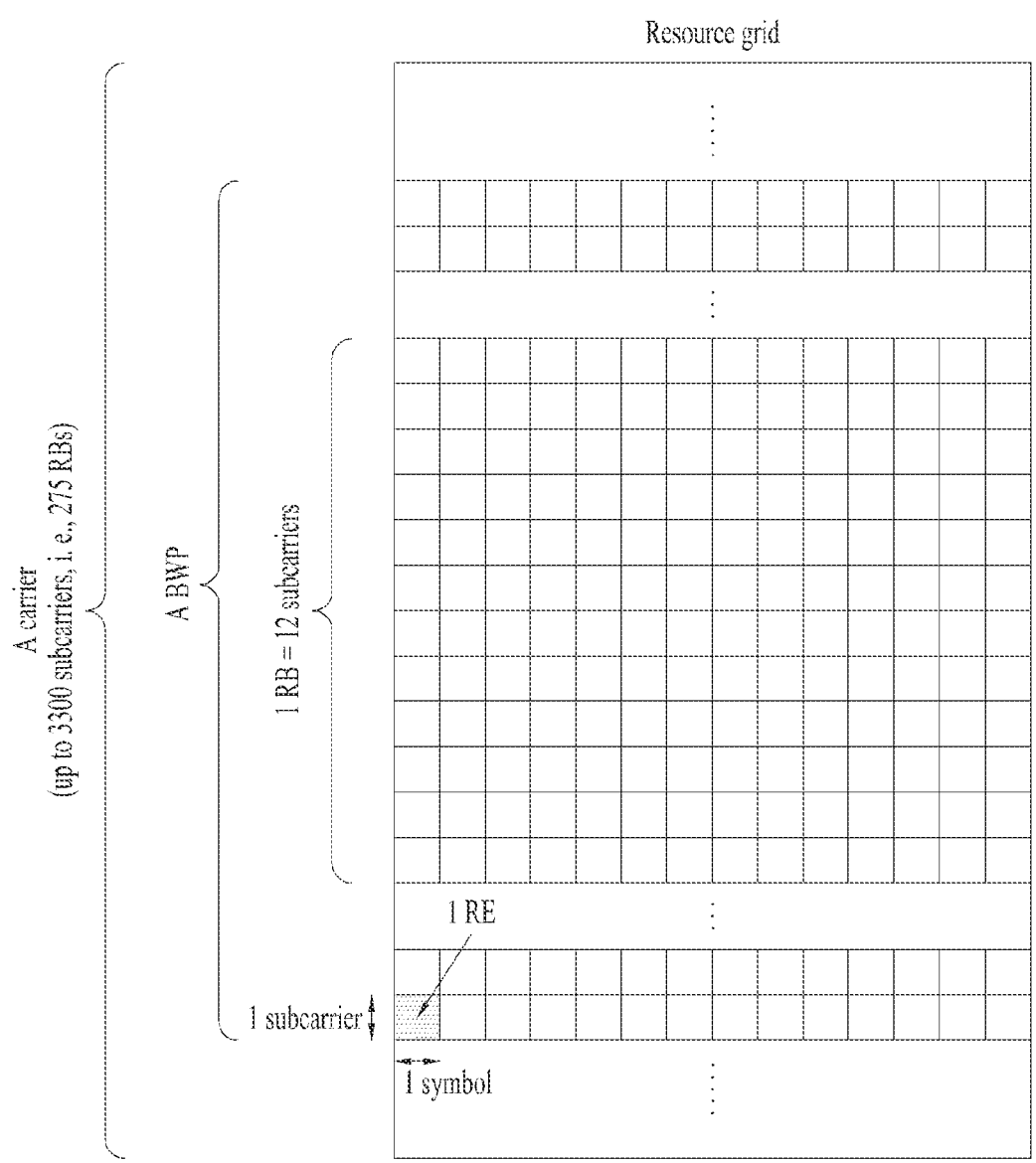

FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., 4) BWPs. Data communication is performed through an activated BWP, and only one BWP may be activated for one UE. In the resource grid, each element is referred to as a resource element (RE), and one complex symbol may be mapped thereto.

Figure 5:
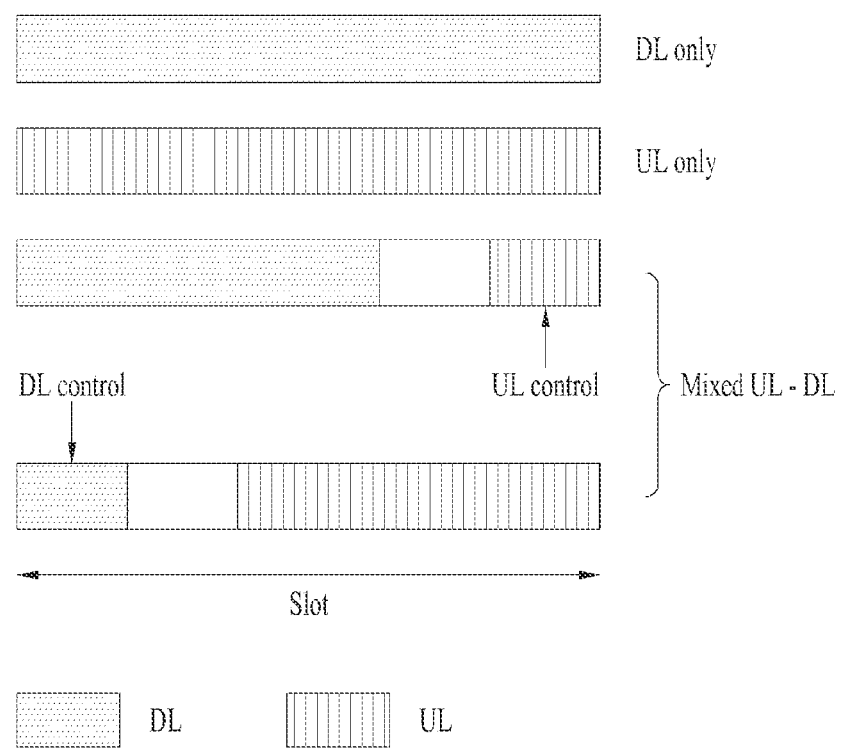

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel. N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+ DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Positioning Reference Signal (PRS) in LTE System

Positioning may refer to determining the geographical position and/or velocity of the UE based on measurement of radio signals. Location information may be requested by and reported to a client (e.g., an application) associated with the UE. The location information may also be requested by a client within or connected to a core network. The location information may be reported in standard formats such as cell-based or geographical coordinates, together with estimated errors of the position and velocity of the UE and/or a positioning method used for positioning.

For such positioning, a positioning reference signal (PRS) may be used. The PRS is a reference signal used to estimate the position of the UE. For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as symbols of subframe #0. If only the MBSFN subframe is configured as the positioning subframe within a cell, OFDM symbols configured for the PRS in the MBSFN subframe may have an extended CP.

The sequence of the PRS may be defined by [Equation 1] below.

$$r_{l,n_s}(m) = \frac{1}{\sqrt{2}}(1 - 2 \cdot c(2m)) + j\frac{1}{\sqrt{2}}(1 - 2 \cdot c(2m+1)),$$ [Equation 1]

$$m = 0, 1, \ldots, 2N_{RB}^{max,DL} - 1$$

where $n_s$ denotes a slot number in a radio frame and l denotes an OFDM symbol number in a slot. $N_{RB}^{max,DL}$ is represented as an integer multiple of $N_{SC}^{RB}$ as the largest value among DL bandwidth configurations. $N_{SC}^{RB}$ denotes the size of a resource block (RB) in the frequency domain, for example, 12 subcarriers.

c(i) denotes a pseudo-random sequence and may be initialized by [Equation 2] below.

$$c_{init} = 2^{28} \cdot \lfloor N_{ID}^{PRS}/512 \rfloor + 2^{10} \cdot (7 \cdot (n_s+1) + l + 1) \cdot (2 \cdot (N_{ID}^{PRS} \bmod 512) + 1) + 2 \cdot (N_{ID}^{PRS} \bmod 512) + N_{CP}$$ [Equation 2]

Unless additionally configured by higher layers, $N_{ID}^{PRS}$ is equal to $N_{ID}^{cell}$, and $N_{CP}$ is 1 for a normal CP and 0 for an extended CP.

Figure 6:
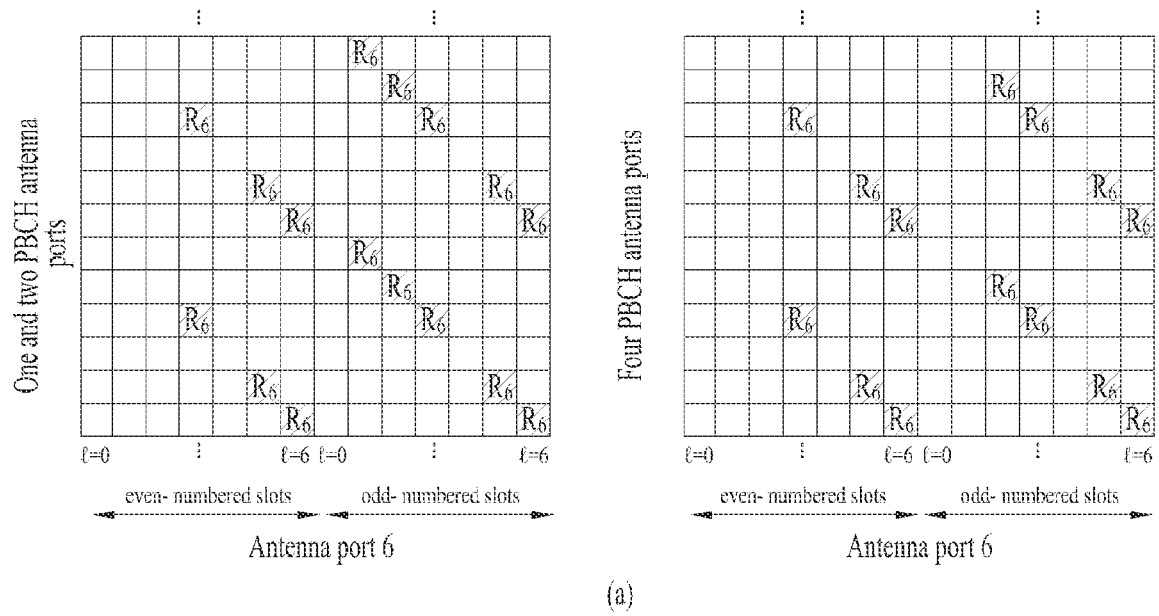
FIG. 6 illustrates an exemplary pattern to which a positioning reference signal (PRS) is mapped in a subframe in LTE system.
Figure 6:
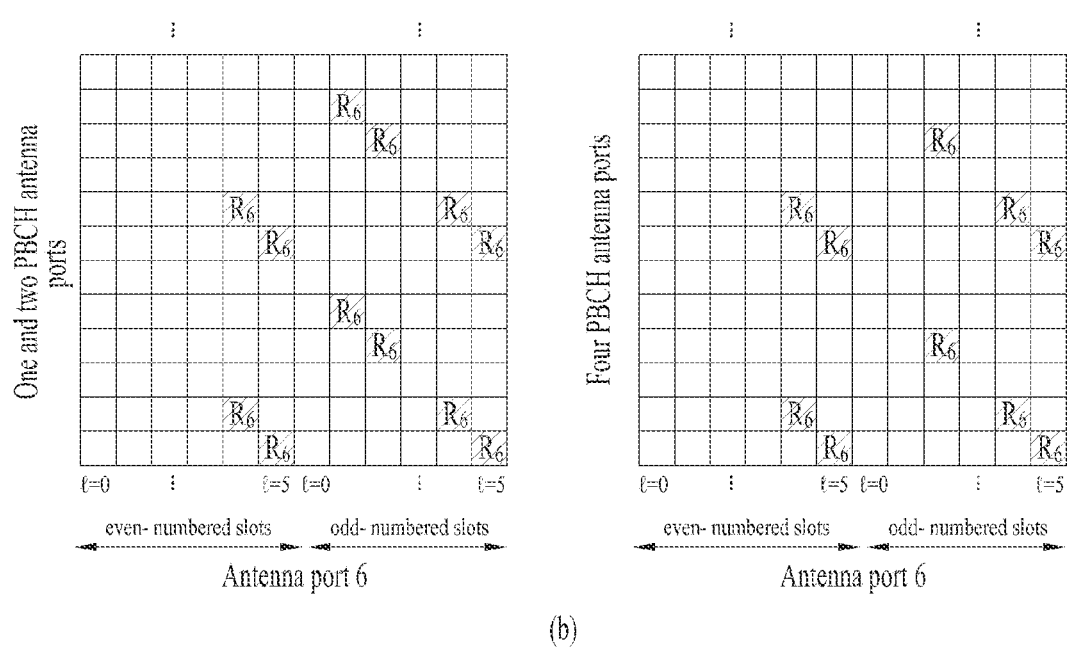

FIG. 6 illustrates an exemplary pattern to which a PRS is mapped in a subframe. As illustrated in FIG. 6, the PRS may be transmitted through an antenna port 6. FIG. 6(a) illustrates mapping of the PRS in the normal CP and FIG. 6(b) illustrates mapping of the PRS in the extended CP.

The PRS may be transmitted in consecutive subframes grouped for positioning. The subframes grouped for positioning are referred to as a positioning occasion. The positioning occasion may consist of 1, 2, 4 or 6 subframes. The positioning occasion may occur periodically at a periodicity of 160, 320, 640 or 1280 subframes. A cell-specific subframe offset value may be defined to indicate the starting subframe of PRS transmission. The offset value and the periodicity of the positioning occasion for PRS transmission may be derived from PRS configuration indexes as listed in [Table 3] below.

TABLE 3

| PRS configuration Index ($I_{PRS}$) | PRS periodicity (subframes) | PRS subframe offset (subframes) |
|---|---|---|
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |

TABLE 3-continued

| PRS configuration Index ($I_{PRS}$) | PRS periodicity (subframes) | PRS subframe offset (subframes) |
|---|---|---|
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | Reserved | |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed to have a low-interference subframe so that no data is transmitted in the positioning subframe. Therefore, the PRS is not subjected to interference due to data transmission although the PRS may interfere with PRSs of other cells.

UE Positioning Architecture in LTE System

Figure 7:
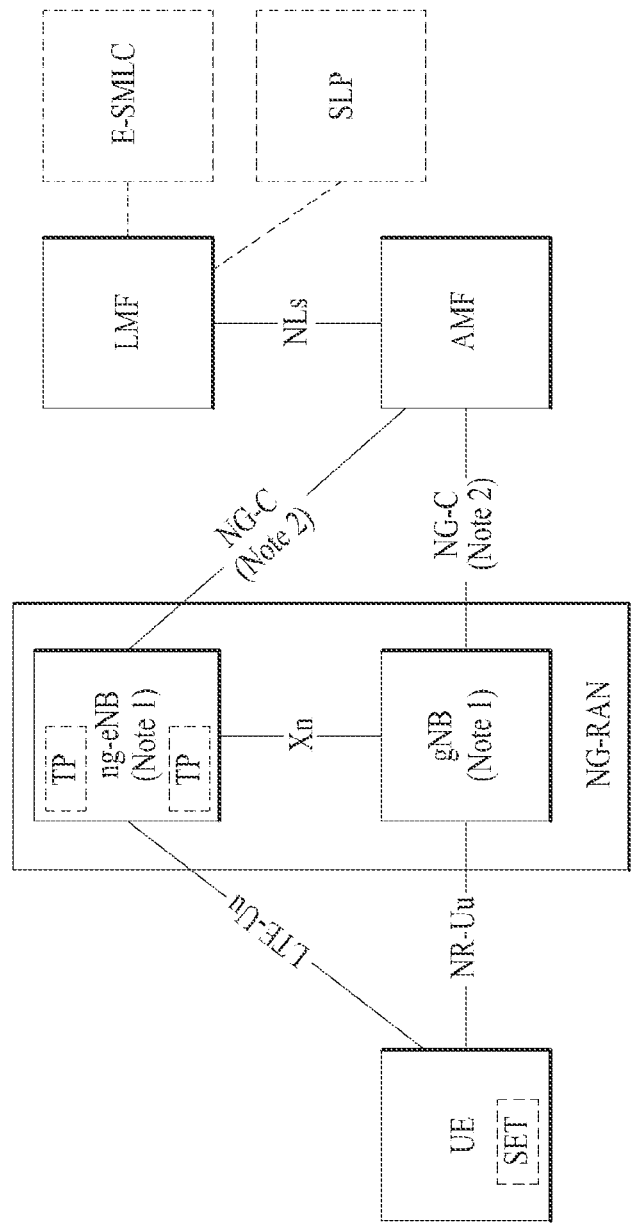
FIGS. 7 and 8 are diagrams illustrating the architecture of a system for measuring the position of a UE and a procedure of measuring the position of the UE.

FIG. 7 illustrates the architecture of a 5G system applicable to positioning of a UE connected to a next generation-radio access network (NG-RAN) or an E-UTRAN.

Referring to FIG. 7, a core access and mobility management function (AMF) may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several transmission points (TPs), such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support an observed time difference of arrival (OTDOA), which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain positioning for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

Operation for UE Positioning

Figure 8:
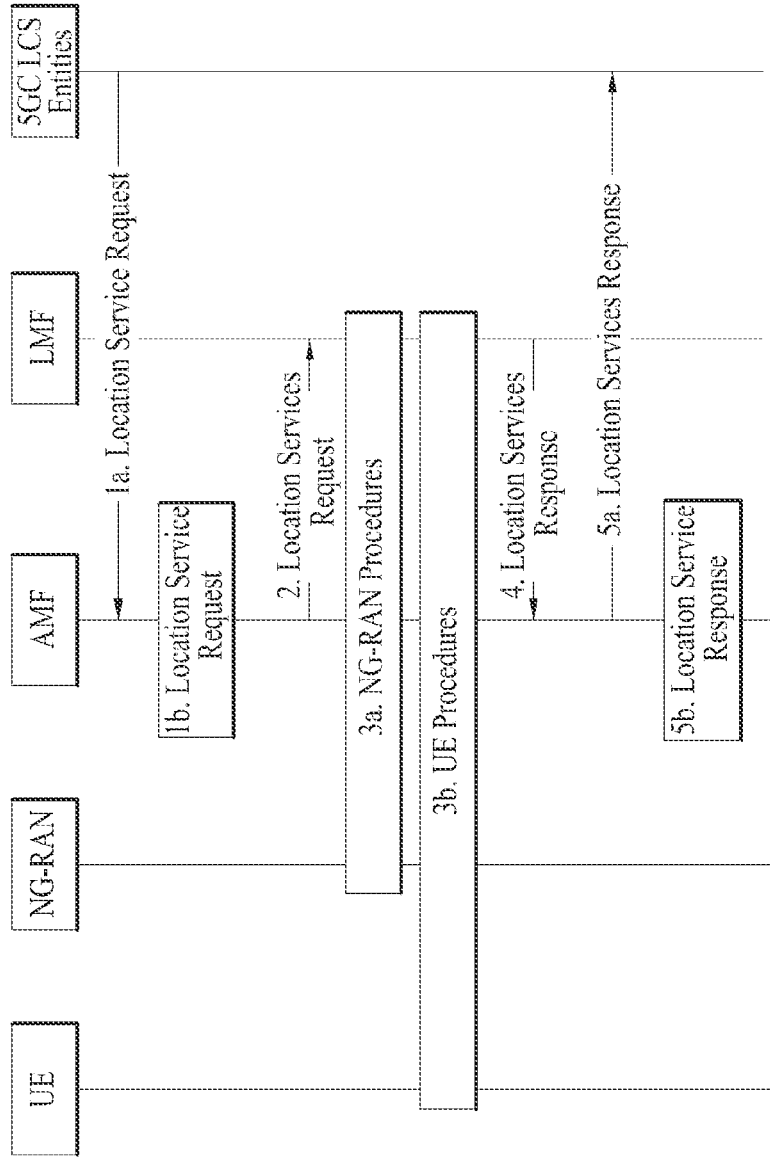

FIG. 8 illustrates an implementation example of a network for UE positioning. When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 8. In other words, in FIG. 8, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 8. In step 1*a*, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1*b*. For example, the serving AMF may determine that itself will perform the location service in order to measure the position of the UE for an emergency call.

In step 2, the AMF transfers the request for the location service to an LMF. In step 3*a*, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3*a* may be an NRPPa protocol which will be described later.

Additionally, in step 3*b*, the LMF may initiate a location procedure for DL positioning together with the UE. For example, the LMF may transmit the location assistance data to the UE or obtain a location estimate or location measurement value. For example, in step 3*b*, a capability information transfer procedure may be performed. Specifically, the LMF may transmit a request for capability information to the UE and the UE may transmit the capability information to the LMF. Here, the capability information may include information about a positioning method supportable by the LMF or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3*b*, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner. In some cases, the LMF may transfer the location assistance data and/or the additional assistance data to the UE without receiving a request for the assistance data from the UE.

As another example, in step 3*b*, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3*b* may be performed independently but may be performed consecutively. Generally, although step 3*b* is performed in order of the capability information transfer procedure, the location assistance data transfer procedure, and the location information transfer procedure, step 3*b* is not limited to such order. In other words, step 3*b* is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 8 has been initiated by step 1a, the AMF may transfer the location service response to a 5GC entity such as a GMLC. If the procedure of FIG. 8 has been initiated by step 1b, the AMF may use the location service response in order to provide a location service related to an emergency call.

Protocol for Location Measurement (1) LTE Positioning Protocol (LPP)

Figure 9:
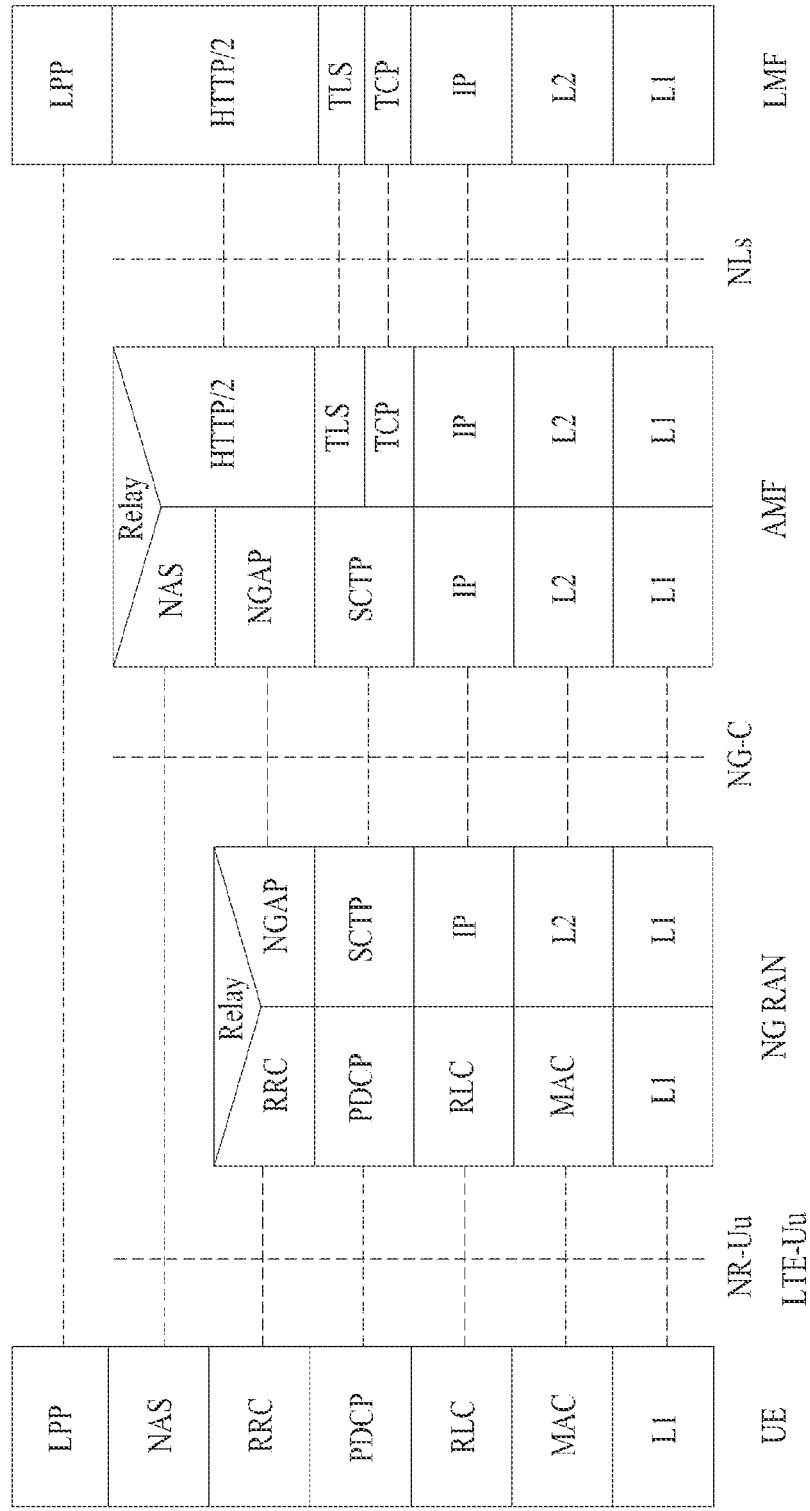
FIG. 9 illustrates an exemplary protocol layer used to support LTE positioning protocol (LPP) message transfer.

FIG. 9 illustrates an exemplary protocol layer used to support LPP message transfer between an LMF and a UE. An LPP protocol data unit (PDU) may be carried in a NAS PDU between an MAF and the UE. Referring to FIG. 9, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate stopping of an LPP procedure, through an LPP message.

(2) NR Positioning Protocol A (NRPPa)

Figure 10:
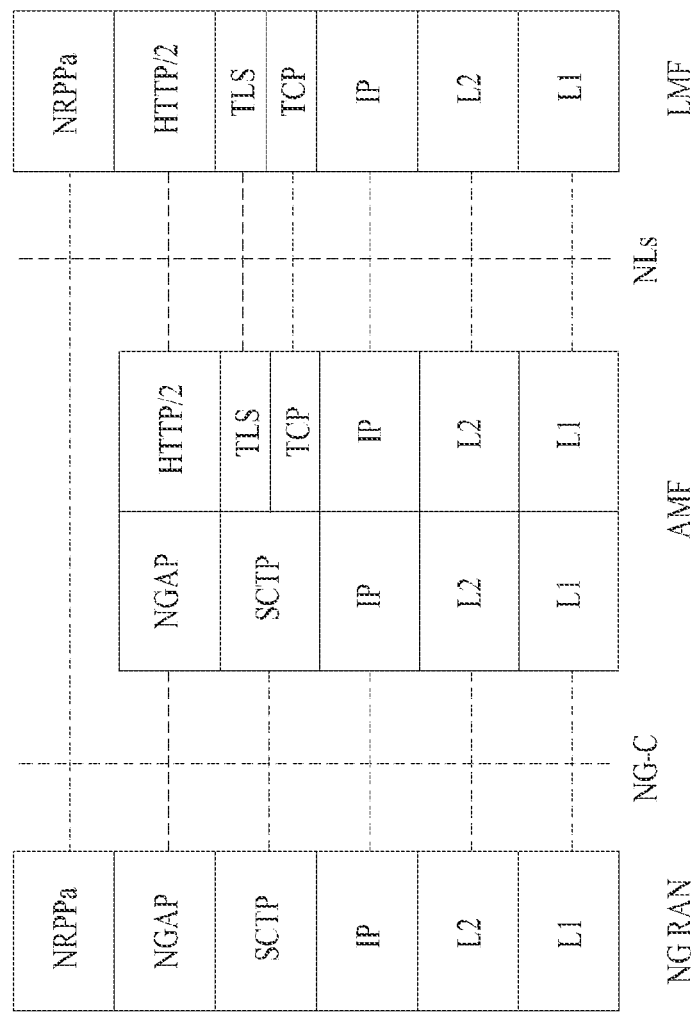
FIG. 10 is a diagram illustrating an exemplary protocol layer used to support NR positioning protocol A (NRPPa) protocol data unit (PDU) transfer.

FIG. 10 illustrates an exemplary protocol layer used to support NRPPa PDU transfer between an LMF and an NG-RAN node. NRPPa may be used to carry information between an NG-RAN node and an LMF. Specifically, NRPPa may exchange an E-CID for measurement transferred from an ng-eNB to an LMF, data for support of an OTDOA positioning method, and a cell-ID and a cell position ID for an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transmitting information about a particular UE (e.g., location measurement information) and the second type is a non-UE-associated procedure for transmitting information applicable to an NG-RAN node and associated TPs (e.g., timing information of the gNB/ng-eNG/TP). The two types may be supported independently or simultaneously.

Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

(1) Observed Time Difference of Arrival (OTDOA)

Figure 11:
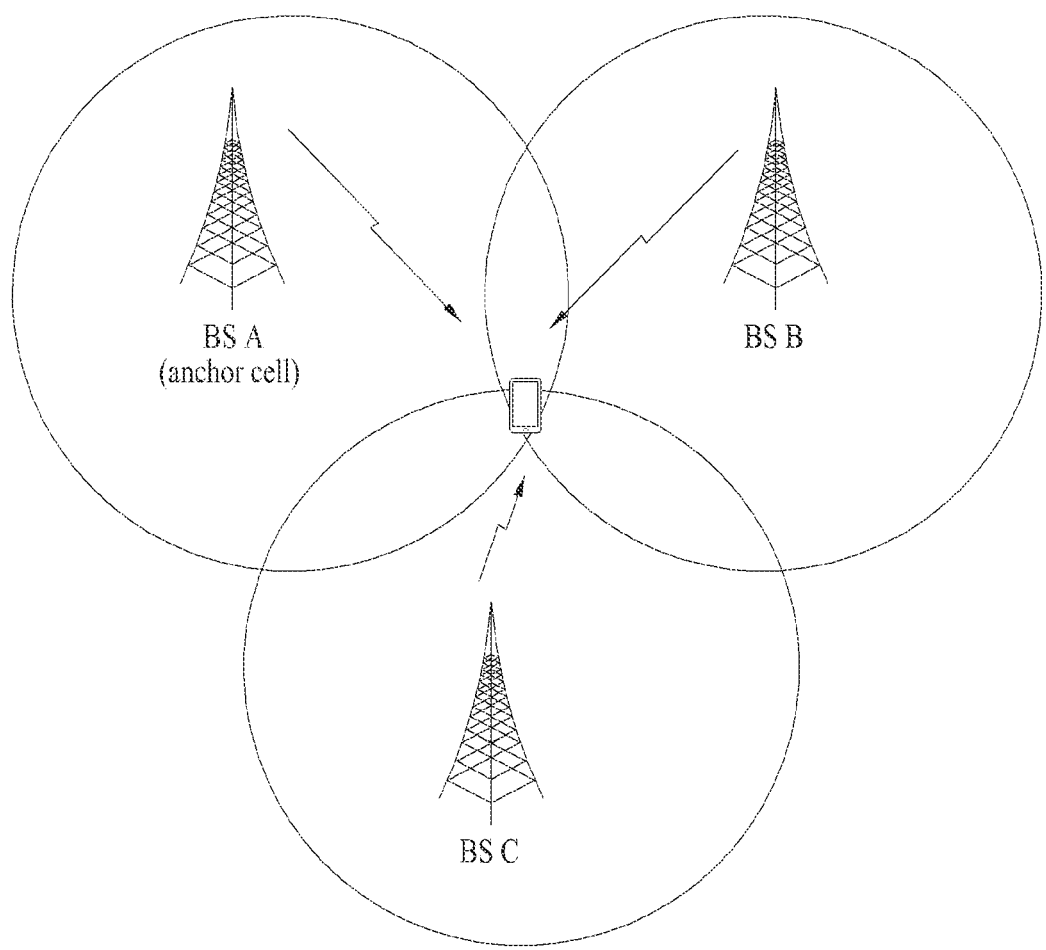
FIG. 11 is a diagram illustrating an embodiment of an observed time difference of arrival (OTDOA) positioning method.

FIG. 11 is a diagram illustrating an OTDOA positioning method. The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure times of arrival (ToAs) of signals received from geographically distributed three or more TPs or BSs. For example, ToAs for TP 1, TP 2, and TP 3 may be measured, and an RSTD for TP 1 and TP 2, an RSTD for TP 2 and TP 3, and an RSTD for TP 3 and TP 1 are calculated based on the three ToAs. A geometric hyperbola may be determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, an RSTD for two TPs may be calculated based on [Equation 3] below.

$$RSTDi, 1 = \frac{\sqrt{(x_t - x_i)^2 + (y_t - y_i)^2}}{c} - \frac{\sqrt{(x_t - x_1)^2 + (y_t - y_1)^2}}{c} + (Ti - T1) + (ni - n1)$$ [Equation 3]

where c is the speed of light, $\{x_t, y_t\}$ are (unknown) coordinates of a target UE, $\{x_i, y_i\}$ are (known) coordinates of a TP, and $\{x_1, y_1\}$ are coordinates of a reference TP (or another TP). Here, $(T_i - T_1)$ is a transmission time offset between two TPs, referred to as "real time differences" (RTDs), and $n_i$ and $n_1$ are UE ToA measurement error values.

(2) Enhanced Cell ID (E-CID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance ($T_{ADV}$), and/or angle of arrival (AoA)

Here, $T_{ADV}$ may be divided into Type 1 and Type 2 as follows.

$T_{ADV}$ Type 1=(ng-eNB RX-TX time difference)+(UE E-UTRA RX-TX time difference)

$T_{ADV}$ Type 2=ng-eNB RX-TX time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

(3) Uplink Time Difference of Arrival (UTDOA)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

Beam Management (BM)

The BM refers to a series of processes for acquiring and maintaining a set of BS beams (transmission and reception point (TRP) beams) and/or a set of UE beams available for DL and UL transmission/reception. The BM may include the following processes and terminology.

Beam measurement: an operation by which the BS or UE measures the characteristics of a received beamformed signal Beam determination: an operation by which the BS or UE selects its Tx/Rx beams Beam sweeping: an operation of covering a spatial domain by using Tx and/or Rx beams for a prescribed time interval according to a predetermined method Beam report: an operation by which the UE reports information about a signal beamformed based on the beam measurement.

UL BM Process

In UL BM, beam reciprocity (or beam correspondence) between Tx and Rx beams may or may not be established according to the implementation of the UE. If the Tx-Rx beam reciprocity is established at both the BS and UE, a UL beam pair may be obtained from a DL beam pair. However, if the Tx-Rx beam reciprocity is established at neither the BS nor UE, a process for determining a UL beam may be required separately from determination of a DL beam pair.

In addition, even when both the BS and UE maintain the beam correspondence, the BS may apply the UL BM process to determine a DL Tx beam without requesting the UE to report its preferred beam.

The UL BM may be performed based on beamformed UL SRS transmission. Whether the UL BM is performed on a set of SRS resources may be determined by a usage parameter (RRC parameter). If the usage is determined as BM, only one SRS resource may be transmitted for each of a plurality of SRS resource sets at a given time instant.

The UE may be configured with one or more SRS resource sets (through RRC signaling), where the one or more SRS resource sets are configured by SRS-ResourceSet (RRC parameter). For each SRS resource set, the UE may be configured with K≥1 SRS resources, where K is a natural number, and the maximum value of K is indicated by SRS_capability.

The UL BM process may also be divided into Tx beam sweeping at the UE and Rx beam sweeping at the BS similarly to DL BM.

Figure 12:
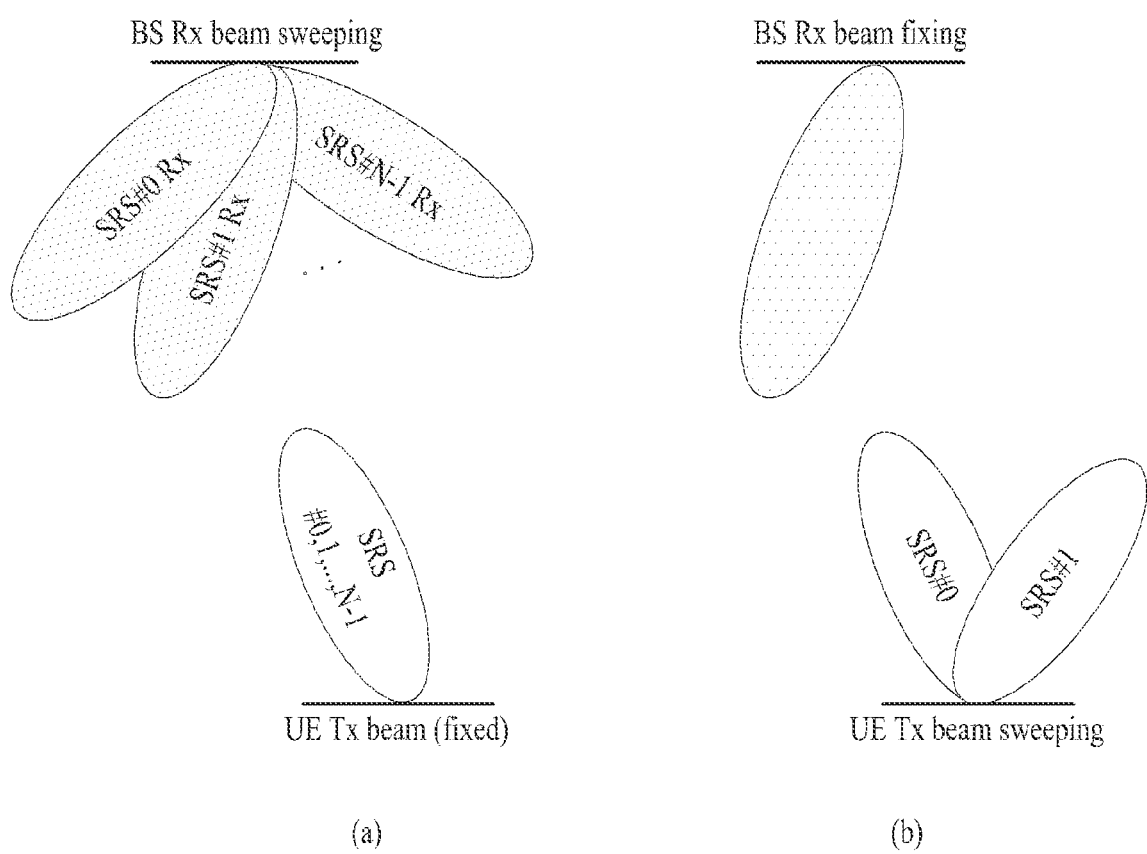
FIGS. 12 and 13 are diagrams illustrating uplink beam management based on a sounding reference signal (SRS).

FIG. 12 illustrates an example of a UL BM process based on an SRS.

FIG. 12(a) shows a process in which the BS determines Rx beamforming, and FIG. 12(b) shows a process in which the UE performs Tx beam sweeping.

Figure 13:
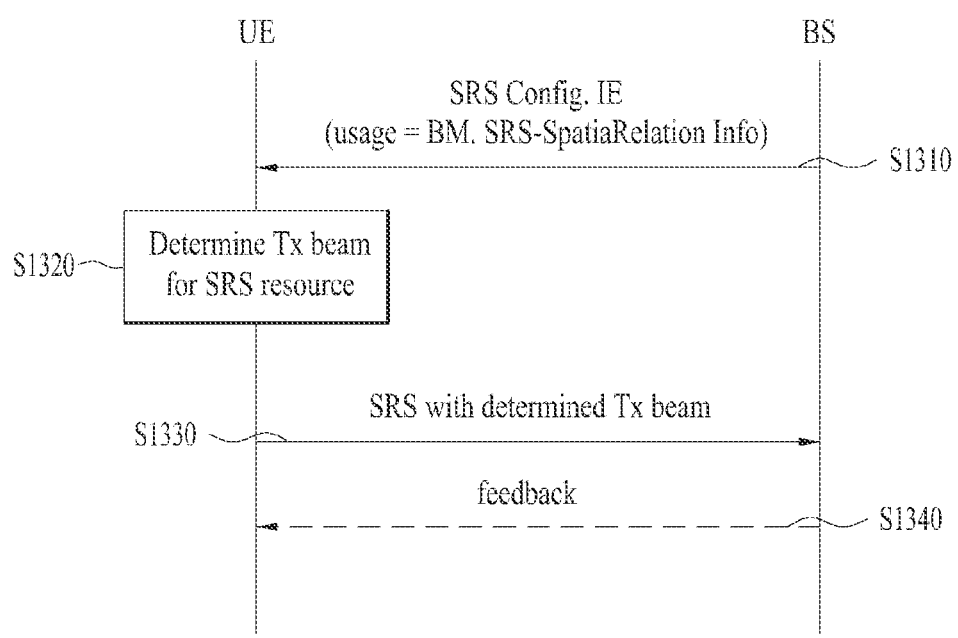

FIG. 13 is a flowchart illustrating an example of a UL BM process based on an SRS.

The UE receives RRC signaling (e.g., SRS-Config IE) including a usage parameter (RRC parameter) set to BM from the BS (S1310). The SRS-Config IE is used to configure SRS transmission. The SRS-Config IE includes a list of SRS resources and a list of SRS resource sets. Each SRS resource set refers to a set of SRS resources.

The UE determines Tx beamforming for SRS resources to be transmitted based on SRS-SpatialRelation Info included in the SRS-Config IE (S1320). Here, the SRS-SpatialRelation Info is configured for each SRS resource and indicates whether the same beamforming as that used for an SSB, a CSI-RS, or an SRS is applied for each SRS resource.

If SRS-SpatialRelationInfo is configured for the SRS resources, the same beamforming as that used in the SSB, CSI-RS, or SRS is applied and transmitted. However, if SRS-SpatialRelationInfo is not configured for the SRS resources, the UE randomly determines the Tx beamforming and transmits an SRS based on the determined Tx beamforming (S1330).

For a P-SRS in which 'SRS-ResourceConfigType' is set to 'periodic':

i) If SRS-SpatialRelationInfo is set to SSB/PBCH', the UE transmits the corresponding SRS by applying the same spatial domain transmission filter as a spatial domain reception filter used for receiving the SSB/PBCH (or a spatial domain transmission filter generated from the spatial domain reception filter);

ii) If SRS-SpatialRelationInfo is set to 'CSI-RS', the UE transmits the SRS by applying the same spatial domain transmission filter as that used for receiving the CSI-RS; or iii) If SRS-SpatialRelationInfo is set to 'SRS', the UE transmits the corresponding SRS by applying the same spatial domain transmission filter as that used for transmitting the SRS.

Additionally, the UE may or may not receive feedback on the SRS from the BS as in the following three cases (S1340).

i) When Spatial_Relation_Info is configured for all SRS resources in an SRS resource set, the UE transmits the SRS on a beam indicated by the BS. For example, if Spatial_Relation_Info indicates the same SSB, CRI, or SRI, the UE repeatedly transmits the SRS on the same beam.

ii) Spatial_Relation_Info may not be configured for all SRS resources in the SRS resource set. In this case, the UE may transmit while changing the SRS beamforming randomly.

iii) Spatial_Relation_Info may be configured only for some SRS resources in the SRS resource set. In this case, the UE may transmit the SRS on an indicated beam for the configured SRS resources, but for SRS resources in which Spatial_Relation_Info is not configured, the UE may perform transmission by applying random Tx beamforming.

Transmission Timing Adjustments

The UE may start UL frame transmission before a time $(N_{TA}+N_{TA\_offset})*T_c$ from the boundary of a DL frame of a reference cell, where $N_{TA}$ is a TA (timing advance) value and $T_c$ is a basic timing unit.

When the UE is provided with a TA offset value through higher layer signaling, the UE may use the provided TA offset value as $N_{TA\_offset}$. If the UE is provided with no TA offset value, the UE may use a default TA offset value as $N_{TA\_offset}$.

If the UE is configured with two UL carriers, $N_{TA\_offset}$ may be equally applied to the two UL carriers.

When the UE receives a timing advance command $(T_A)$ for a timing advance group (TAG), the UE may adjust the UL transmission timing for PUSCH/SRS/PUCCH transmission on all serving cells included in the TAG based on $N_{TA\_offset}$. In other words, the values of $T_A$ and $N_{TA\_offset}$ may be equally applied to all serving cells included in the TAG.

Meanwhile, $T_A$ for the TAG indicates a relative difference between the current UL timing and the adjusted UL timing as a multiple of $16*64*T_c/2^\mu$, where $2^\mu$ may be determined according to the SCS.

For example, in the case of a random access response (RAR), the values of $N_{TA}$ may be indicated by the indices of $T_A$. Specifically, when it is determined that $N_{TA}=T_A*16*64/2^\mu$, the first UL transmission timing of the UE after reception of the RAR may be indicated by $N_{TA}$.

For other cases except the RAR, the values of $N_{TA}$ may also be indicated by the indices of $T_A$. In this case, the following equation may be satisfied: $N_{TA\_new}=N_{TA\_old}+(T_A-31)*16*64/2^\mu$, where $N_{TA\_old}$ is a current $N_{TA}$ value and $N_{TA\_new}$ is a newly applied $N_{TA}$ value.

If an activate UL BWP is changed between a time at which the UL transmission timing is adjusted and a time at which $T_A$ is received, the UE may determine the TA value based on the SCS of the new active UL BWP. If the active UL BWP is changed after the adjustment of the UL transmission time, the UE may assume that the absolute value of $T_A$ is the same before or after the change of the active UL BWP.

Sounding Reference Signal (SRS) Power Control

The UE may distribute the same power to antenna ports configured for SRS transmission. If the UE transmits an SRS on active UL BWP b of carrier f of serving cell c using SRS power control adjustment state index 1, SRS transmission power in SRS transmission occasion i may be determined as shown in Equation 4.

$$P_{SRS,b,f,c}(i, q_s, l) = $$
$$\min \left\{ \begin{array}{l} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot \\ PL_{b,f,c}(q_d) + h_{b,f,c}(i, l) \end{array} \right\} [dBm].$$

In Equation 4, $P_{CMAX,f,c}(i)$ denotes the maximum power output by the UE for carrier f of serving cell c in SRS transmission occasion i, and $P_{O\_SRS,b,f,c}(q_s)$ may be obtained based on SRS resource set $q_s$ and $p_0$ for active UL BWP b.

In addition, $M_{SRS,b,f,c}(i)$ is an SRS bandwidth expressed in the number of RBs for SRS transmission occasion i on active UL BWP b, and $\alpha_{SRS,b,f,c}(q_s)$ may be obtained from alpha for UL BWP b of carrier f of serving cell c and SRS resource set $q_s$. $PL_{b,f,c}(q_d)$ is a DL pathloss estimate in dB and may be calculated based on RS index $q_d$ for an active DL BWP of the serving cell and SRS resource set $q_s$. The RS index $q_d$ is provided by the higher layer parameter pathlossReferenceRS associated with SRS resource set $q_s$. The UE may obtain an SS/PBCH block index or a CSI-RS resource index from pathlossReferenceRS. If the UE does not receive pathlossReferenceRSs, the UE may obtain $PL_{b,f,c}(q_d)$ by using as a RS resource the SS/PBCH block index obtained from a master information block (MIB).

Additionally, $h_{b,f,c}(i)$ may be defined by $$h_{b,f,c}(i) = h_{b,f,c}(i-i_0) + \sum_{m=0}^{C(S_i)-1} \delta_{SRS,b,f,c}(m),$$

where the value of $\delta_{SRS,b,f,c}$ may be determined according to a predetermined table. In addition, $\delta_{SRS,b,f,c}(m)$ may be jointly coded with other transmit power control (TPC) commands included in DCI format 2_3, and $$\sum_{m=0}^{C(S_i)-1} \delta_{SRS,b,f,c}(m)$$

may be determined based on the sum of TPC command values included in a specific TPC command set.

For a system supporting new radio or new radio access technology (new RAT) (NR) communication, various methods of tracking and measuring the positions of individual UEs by a BS or UE have been discussed. In general, the location of a UE may be calculated based on information about distances between the UE and BSs of which the locations are already known. For example, the location of the UE may be obtained by calculating a round trip time (RTT) for the distances between the UE and BSs, or the location of the UE may be obtained from information about distance differences between the UE and BSs (TDOA).

For a system supporting LTE communication, a positioning reference signal (PRS) has been defined to improve the reliability of measuring the time required for a signal transmitted from the BS to arrive at the UE. Specifically, the UE may measure the location of the UE based on the PRS according to the OTDOA scheme and report the location to the location server and/or BS. Further, UTDOA measurement has also been defined in the system supporting LTE communication. Specifically, an SRS may be used for the UTDOA measurement. That is, since the SRS is capable of being transmitted in a wide frequency band, TOA measurement may have high accuracy if each BS measures time of arrival (TOA) based on the SRS.

Hereinbelow, a UL-PRS/SRS may mean a UL-PRS and/or an SRS. The SRS may be an SRS configured for positioning. Similarly, a BS/LMF/location server and a BS/TP may mean a BS, an LMF and/or a location server, and a BS and/or a TP, respectively.

Figure 14:
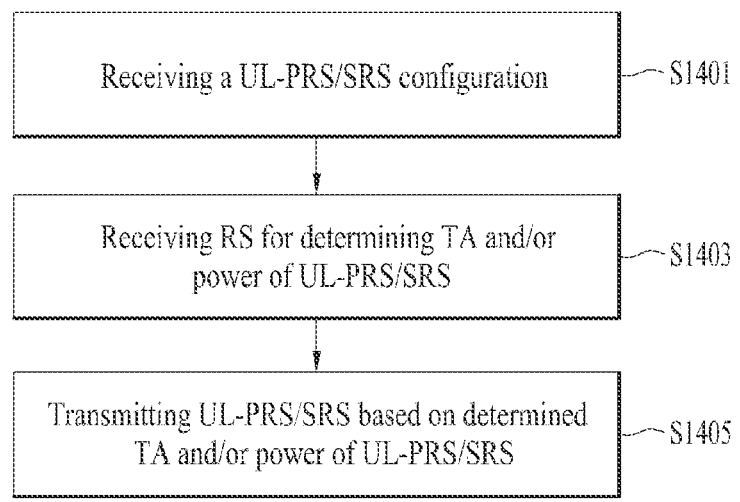
FIGS. 14 to 17 are diagrams illustrating implementation examples of operations of a UE, a base station, and a location server according to the present disclosure.
Figure 15:
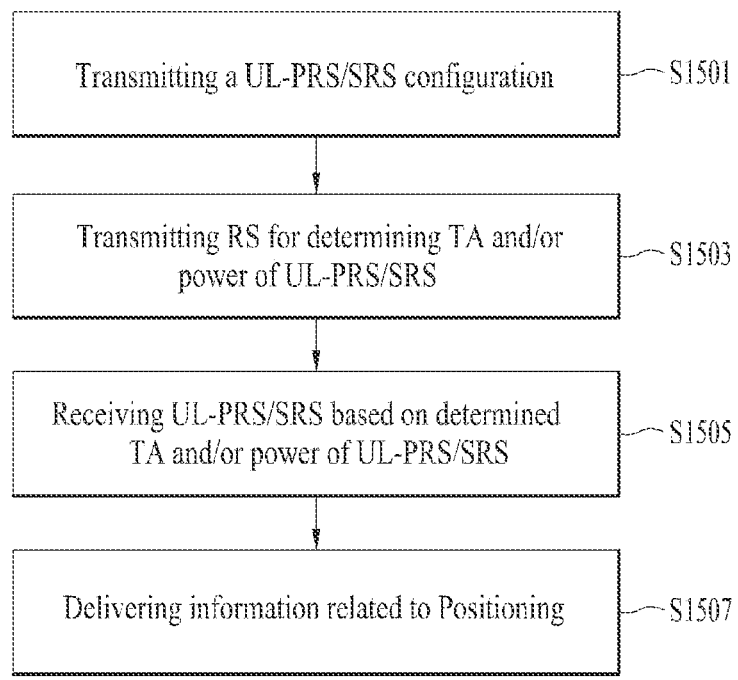
Figure 16:
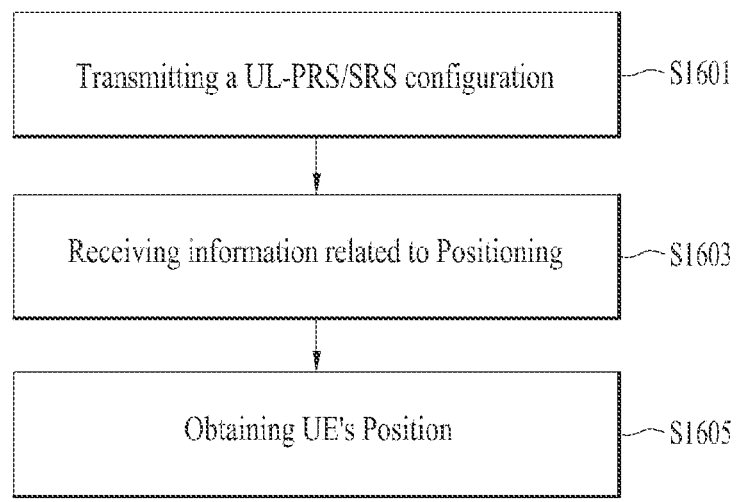

FIGS. 14 to 16 are diagrams illustrating implementation examples of operations of a UE, a BS, and a location server according to embodiments of the present disclosure.

Referring to FIG. 14, the UE may receive information about a UL-PRS/SRS configuration from the location server and/or BS (S1401).

The UE may receive an RS for determining the TA value and/or power of a UL-PRS/SRS from the BS (S1403). In this case, the RS may be an SS/PBCH block and/or a DL-PRS. Methods of determining the TA value and/or power of the UL-PRS/SRS based on the RS will be described later in Embodiments 2 and 3.

The UE may transmit the UL PRS/SRS based on the determined TA value and/or power of the UL-PRS/SRS (S1405). In this case, the format of the UL-PRS/SRS transmitted by the UE may be determined according to Embodiment 1. The UE of FIG. 14 may be one of the various wireless devices which will be described in FIGS. 20 to 22. For example, the UE of FIG. 14 may be a first wireless device 100 of FIG. 20 or a wireless devices 100 or 200 of FIG. 21. In other words, the UE operations disclosed in FIG. 14 may be performed and executed by one of the various wireless devices described in FIGS. 20 to 22.

Referring to FIG. 15, the BS may transmit information about a UL-PRS/SRS configuration to the UE (S1501). If the location server transmits the information about the UL-PRS/SRS configuration to the UE, step S1401 may be skipped. The information about the UL-PRS/SRS configuration transmitted in step S1501 may be information transmitted from the location server to the BS. That is, in this case, the BS may forward the information about the UL-PRS/SRS configuration received from the location server to the UE.

The BS may transmit an RS for determining the TA value and/or power of a UL-PRS/SRS to the UE (S1503). In this case, the RS may be an SS/PBCH block and/or a DL-PRS. Methods of determining the TA value and/or power of the UL-PRS based on the RS will be described later in Embodiments 2 and 3.

The BS may receive the UL-PRS/SRS from the UE based on the determined TA value and/or power of the UL-PRS/SRS (S1505). In this case, the format of the UL-PRS/SRS transmitted by the UE may be determined according to Embodiment 1.

The BS may transmit information related to positioning to the location server (S1507). In this case, the BS may directly measure the location of the UE and transmit the measured value to the location server. On the other hand, the BS may transmit RSTD, TOA, and/or AOA information measured based on the UL-PRS/SRS or values for calculating the RSTD, TOA, and/or AOA information to the location server, instead of directly measuring the location of the UE. Then, the location server may calculate the accurate location of the UE. The BS of FIG. 15 may be one of the various wireless devices which will be described in FIGS. 20 to 22. For example, the BS of FIG. 15 may be a second wireless device 200 of FIG. 20 or the wireless devices 100 or 200 of FIG. 21. In other words, the BS operations disclosed in FIG. 15 may be performed and executed by one of the various wireless devices described in FIGS. 20 to 22.

Referring to FIG. 16, the location server may transmit information on a UL-PRS/SRS configuration (S1601). The location server may transmit the UL-PRS/SRS configuration information to the UE or BS. If the location server transmits the UL-PRS/SRS configuration information to the BS, the BS may forward the information to the UE.

The location server may receive information related to positioning of the UE from the BS (S1603). In this case, the information may be information about the location of the UE directly measured by the BS. On the other hand, the corresponding information may be RSTD, TOA and/or AOA information measured based on the UL-PRS/SRS or values for calculating the RSTD, TOA, and/or AOA information.

If the information is the RSTD, TOA and/or AOA information measured based on the UL-PRS/SRS or the values for calculating the RSTD, TOA and/or AOA information, the location server may directly calculate and obtain the location of the UE (S1605).

Figure 23:
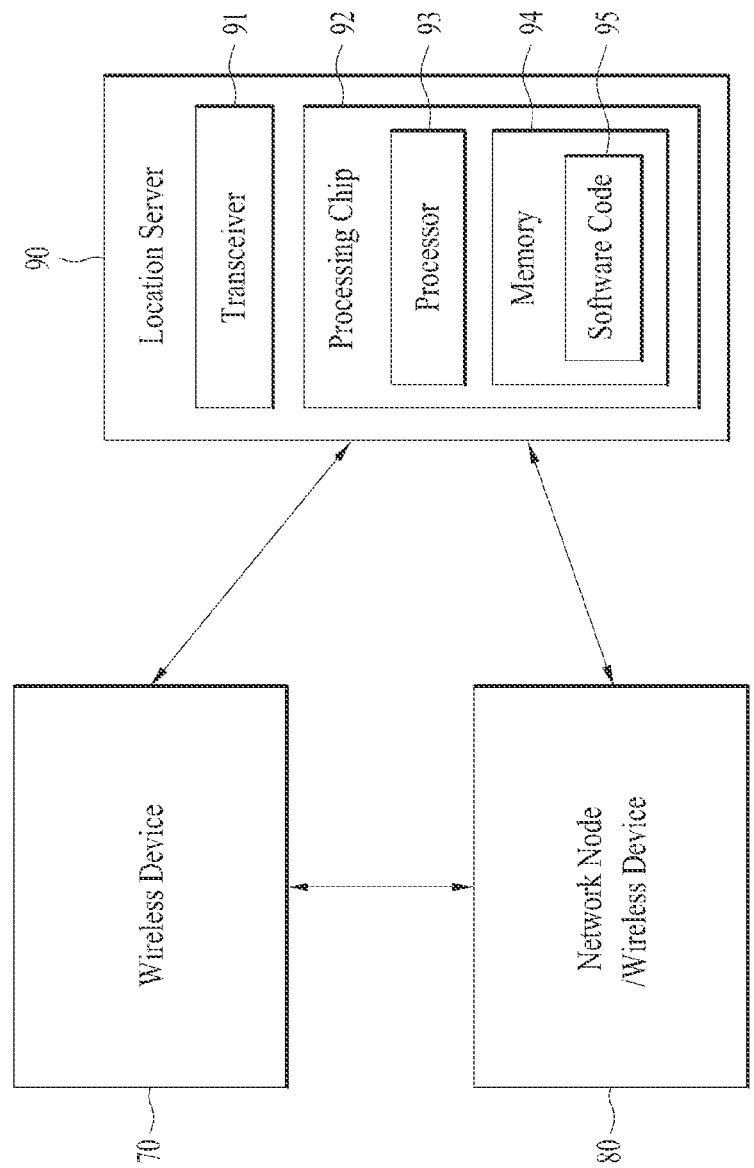
FIG. 23 illustrates an exemplary location server to which embodiments of the present disclosure are applied.

The location server of FIG. 16 may be a location server 90 of FIG. 23. In other words, the operations of the location server disclosed in FIG. 16 may be performed and executed by the location server 90 of FIG. 23.

Figure 17:
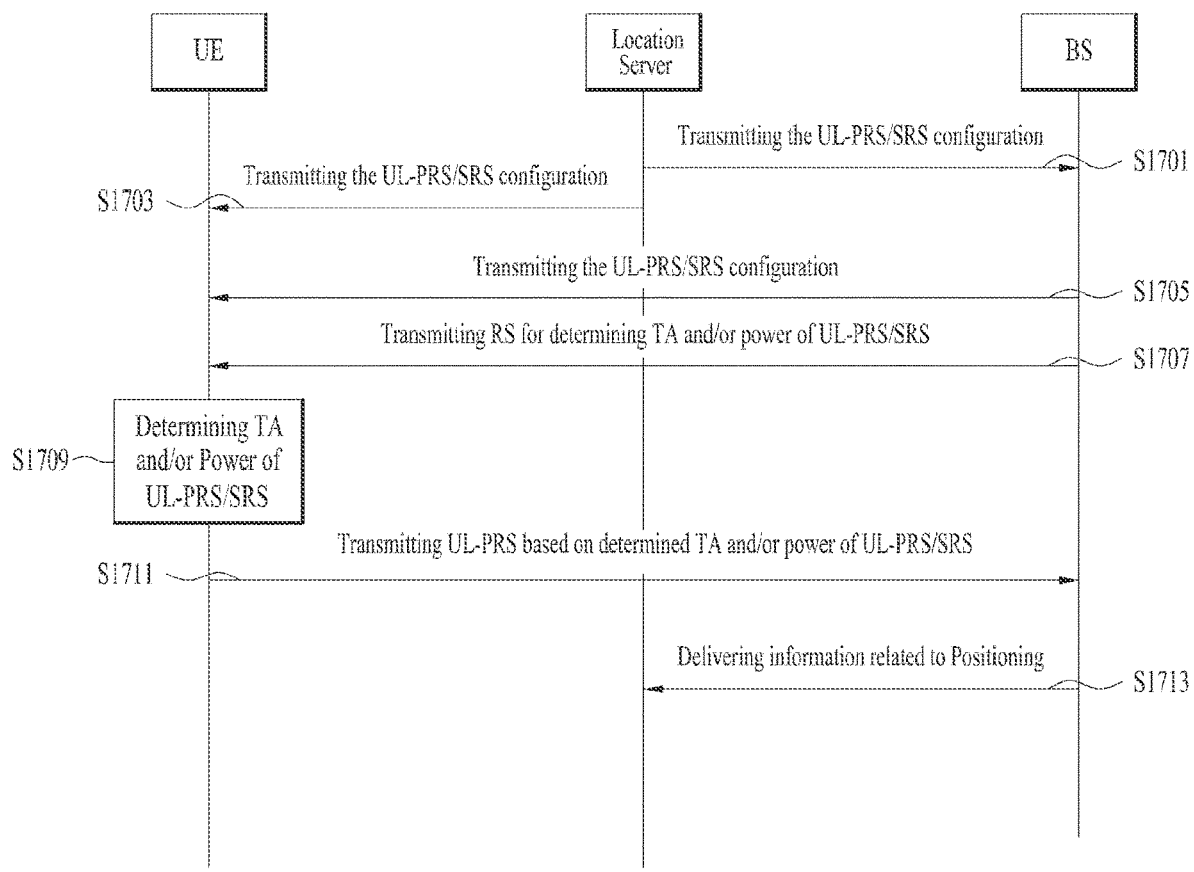

Referring to FIG. 17, the location server may transmit information on a UL-PRS/SRS configuration to the UE or BS (S1701 to S1703). If the location server transmits the UL-PRS/SRS configuration information to the BS, the BS may forward the information to the UE (S1705). In other words, if step S1703 is performed, step S1705 may be omitted. That is, only one of the steps S1703 and S1705 may be performed, and it may be optional.

The BS may transmit an RS for determining the TA value and/or power of a UL-PRS/SRS to the UE (S1707). In this case, the RS may be an SS/PBCH block and/or a DL-PRS. The UE may determine the TA value and/or power of the UL-PRS/SRS based on the RS (S1709). In this case, methods by which the UE determines the TA value and/or power of the UL-PRS/SRS based on the RS will be described later in Embodiments 2 to 3.

The UE may transmit the UL-PRS/SRS based on the determined TA value and/or power of the UL-PRS/SRS (S1711). In this case, the format of the UL-PRS/SRS transmitted by the UE may be determined according to Embodiment 1. The BS may transmit information related to positioning to the location server (S1713). In this case, the BS may directly measure the location of the UE and transmit the measured value to the location server. On the other hand, the BS may transmit RSTD, TOA, and/or AOA information measured based on the UL-PRS/SRS or values for calculating the RSTD, TOA, and/or AOA information to the location server, instead of directly measuring the location of the UE. Then, the location server may calculate the accurate location of the UE.

Herein, the term 'base station (BS)' is used for convenience of description, but this may mean a TP and/or a location server. In the present disclosure, the term 'BS; may be interpreted as a BS, a TP, and/or a location server.

Embodiment 1: Signal Format of UL-PRS/SRS

To improve the accuracy of final UE position information, the UL-PRS/SRS needs to be measured not only for a serving cell but also for neighboring cells as many as possible. To this end, a signal defined as the UL-PRS/SRS needs to be transmitted for a long period of time so that distant BSs are capable of receiving the signal. For example, the SRS may be used as the UL-PRS/SRS to improve signal reception quality. As shown in FIG. 18(a), the UL-PRS/SRS may be configured to be repeatedly transmitted, and the UE may transmit the UL-PRS/SRS in a plurality of OFDM symbols during one period. In addition, the BS may obtain TOA by performing correlation on the UL-PRS/SRS transmitted in the plurality of OFDM symbols.

Referring to FIG. 18(a), the SRS is generally composed of a cyclic prefix (CP) and a UL-PRS/SRS sequence, which may be mapped to one OFDM symbol. Accordingly, the repeated transmission of the UL-PRS/SRS may mean that the UL-PRS/SRS is repeatedly transmitted in a plurality of OFDM symbols. FIG. 18(a) shows that the UL-PRS/SRS is configured by mapping the UL-PRS/SRS to two OFDM symbols. The BS may perform time-domain correlation on the above-described UL-PRS/SRS. Alternatively, the BS may perform fast correlation using a fast Fourier transform (FFT) to reduce the amount of computation, instead of directly performing the correlation on the UL-PRS/SRS. However, this method requires independent FFT processing because the OFDM symbol boundary of the UL-PRS/SRS is different from those of other UL signals/channels, thereby increasing the complexity.

To simplify the structure of a receiver (e.g., receiver of the BS), the UL-PRS/SRS may be configured as shown in FIG. 18(b). FIG. 18(b) shows that the UL-PRS/SRS is configured in a similar way to a RACH preamble of the NR system. For example, when the sequence of the UL-PRS/SRS is repeated twice for coverage extension, a CP may be allocated to a portion obtained by excluding a portion in which the UL-PRS/SRS sequence is repeated twice from a duration of two OFDM symbols. In other words, when the UL-PRS/SRS sequence is configured to be repeated N times, the UL-PRS/SRS sequence is repeated N times so that the repeated sequence is concatenated, and the CP may be allocated to a front portion of the remaining duration of N OFDM symbols. Further, the CP may be allocated to a part of the front portion of the remaining duration, and the rear portion may be set as a gap duration. In this structure, if the maximum distance between the UE and the BS receiving the UL-PRS/SRS is sufficiently large, the receiver may regard a part corresponding to the first symbol as the CP and perform reception for a period after the first symbol.

To reduce the reception complexity, FFT processing may be performed based on the OFDM symbol boundary of the BS. For example, if front-end FFT processing operates in accordance with the OFDM symbol boundary of a multiplexed channel, the reception complexity may be significantly reduced. Examples (a)/(b) of FIG. 18(b) show allocation of the UL-PRS/SRS when the distance between the transmitter and receiver at a receiving side is 0 and the TA value of the UL-PRS/SRS is 0. In other words, examples (a)/(b) of FIG. 18(b) show that that different CPs are allocated to the same SRS.

Example (c) of FIG. 18(b) shows a receiving window when the UL-PRS/SRS is delayed and received. When the UL-PRS/SRS sequence is configured to be repeated three or more times, the boundary of FFT processing performed at the receiver may change depending on the UL-PRS/SRS sequence. Thus, when combining the repeatedly transmitted UL-PRS/SRS sequence, the BS may compensate for the length of the boundary changed due to the repetition of the UL-PRS/SRS sequence.

The receiver may perform time-domain correlation on the entirety of the sequence as shown in FIG. 18(a).

In the structure as shown in FIG. 18(a), every UL-PRS/SRS sequence includes the CP, and the CP and UL-PRS/SRS sequence are repeated as one set. In this structure, if the receiver operates in an environment having a small frequency offset and if the speed of the UE is low so that there is no significant phase change during the entire UL-PRS/SRS period, the receiver may assume the maximum distance to the UE and combine UL-PRS/SRS sequences in advance in the unit of the UL-PRS/SRS sequence length in the time domain in order to perform one-shot correlation as shown in example (d) of FIG. 18(b).

Figure 18:
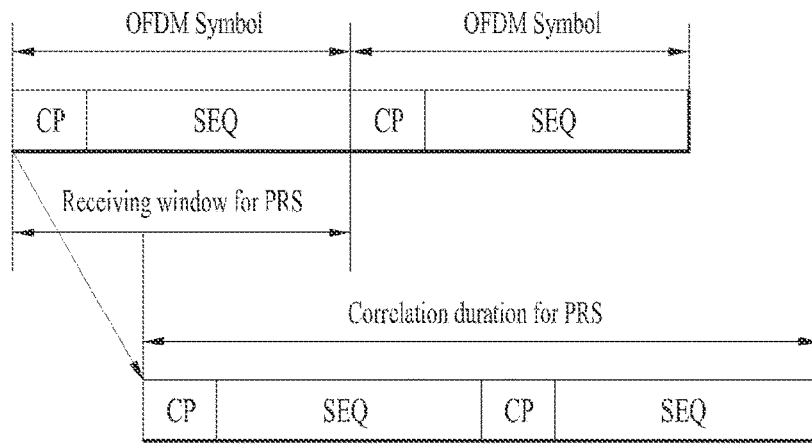
FIG. 18 is a diagram illustrating the structure of an uplink reference signal for positioning according to the present disclosure.
Figure 18:
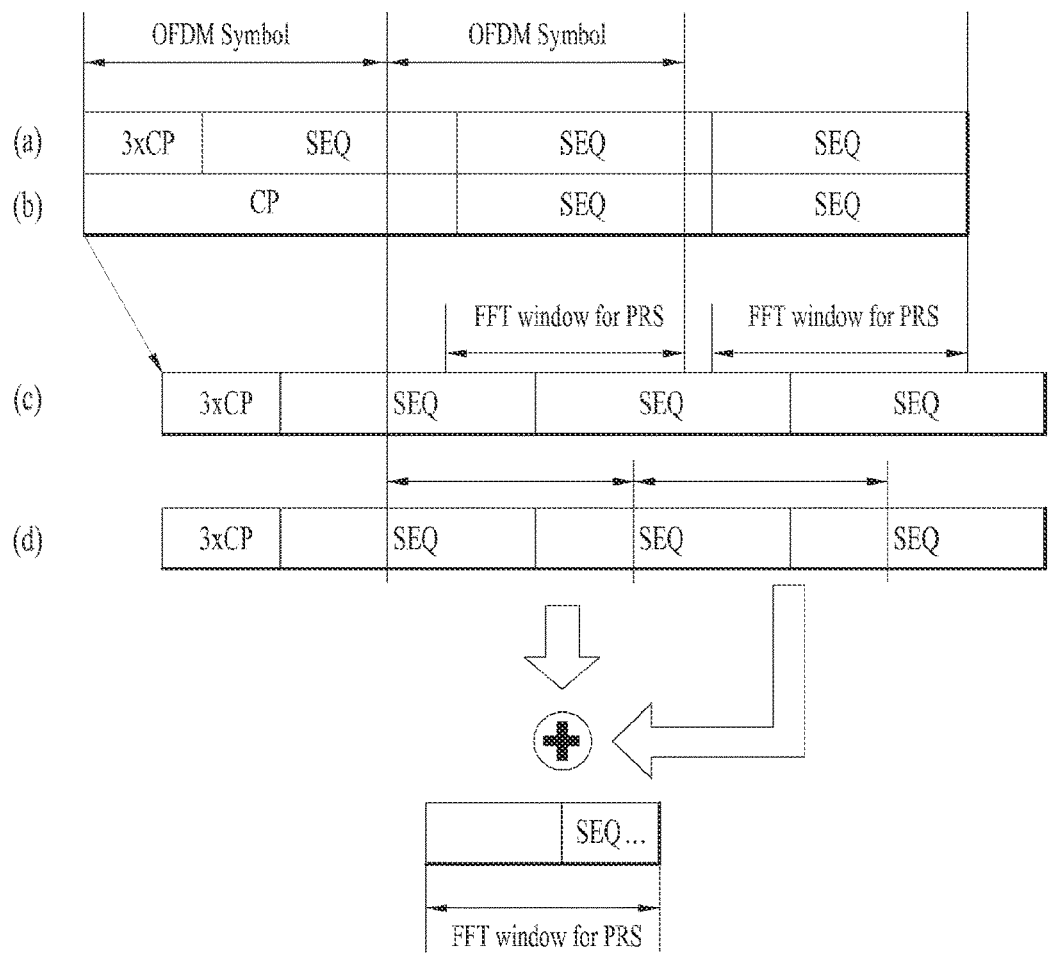

On the other hand, in the structure as shown in FIG. 18, if the frequency band of the UL-PRS/SRS is large, the accuracy of time estimation may be improved, and thus, the UL-PRS/SRS may be desirable to have a wide frequency band. However, if the allocated frequency band is too wide compared to necessary positioning performance, it may cause resource waste. Further, the coverage of the UL-PRS/SRS may be reduced due to wideband characteristics. Therefore, the BS and/or the location server needs to appropriately configure the frequency band for the UL-PRS/SRS.

Embodiment 2: TA for UL-PRS/SRS and UL-PRS/SRS Resources

In the LTE or NR system, a UL signal/channel may be transmitted after applying a TA value configured by the BS. The TA value refers to a value configured to transmit a UL signal/channel before a time corresponding to the TA value from the OFDM symbol boundary obtained from a DL signal. The TA value may be configured to prevent a mismatch between the time boundaries of the BS and UE due to a delay that occurs while the UL signal/channel is transmitted.

Since a PRACH is a channel used for initial transmission, the UE transmits the PRACH based a predefined default TA value. In the LTE and NR systems, the default TA value is set to 0 for frequency division duplex (FDD). For time division duplex (TDD), the default TA value is set to a positive number in consideration of the Tx-Rx switching time of the BS.

Since a UL-PRS/SRS is not a signal for initial transmission, a TA value configured by a serving cell may be applied. However, since the UL-PRS/SRS needs to be received not only by the serving cell but also by a plurality of adjacent cells, it may not be desirable to apply only the TA value configured by the serving cell. In particular, when a neighboring cell that expects to receive the UL-PRS/SRS is located closer to the UE than the serving cell, if the transmission timing is configured with respect to the serving cell, the neighboring cell closer to the UE may receive the UL-PRS/SRS at a time before an expected minimum distance or time. When the UL-PRS/SRS is received before the expected minimum time, the UL-PRS/SRS may be measured as if the UL-PRS/SRS is significantly delayed, depending on computation at the receiver. That is, even though the UL-PRS/SRS is actually received earlier than expected, the UL-PRS/SRS may be measured during the computation as if the UL-PRS/SRS is significantly delayed.

Therefore, a prescribed TA offset value (Offset_TA) may be additionally applied to the TA value configured by the serving cell before transmission of the UL-PRS/SRS, and then the UL-PRS/SRS may be transmitted. The following methods may be applied to determine Offset_TA.

1) The UE sets as Offset_TA a signal reception time difference between the serving cell and a cell that transmits a DL signal having the shortest arrival time (i.e., DL signal arrives first at the UE). Here, the DL signal may be an SS/PBCH block, a CSI-RS and/or a DL-PRS.

If there is no special configuration, the UE may derive Offset_TA with respect to a cell that transmits a DL signal having the shortest arrival time among all cells detected by the UE. However, if the BS configures cells that will receive the UL-PRS/SRS, the UE may determine as Offset_TA a signal reception time difference between the serving cell and a cell that transmits a DL signal having the shortest arrival time among the configured cells. Further, to improve reliability, the UE may determine as Offset_TA a signal reception time difference between the serving cell and a cell that transmits a DL signal having the shortest arrival time among cells of which the reception quality is within a predetermined threshold with respect to a cell having the best reception quality. In this case, the predetermined threshold may be predefined or configured by higher and/or physical layers. Additionally, the UE may report information about Offset_TA and information about the cell used as the reference for calculating Offset_TA value to the BS/LMF/location server in order for the BS to calculate the RTT for a specific cell.

2) Since Offset_TA is related to a reception window for reception at the BS, the BS may directly configure Offset_TA by reflecting the maximum distance and channel environment between the UE and a specific BS receiving the UL-PRS. In this case, the BS that configures Offset_TA may be equal to or different from the specific BS that acts as the reference for configuring Offset_TA. Further, Offset_TA directly configured by the BS may be an offset value for the TA value configured by the serving cell or an offset value for the default TA value configured based on the serving cell reception timing.

3) The UE may transmit the UL-PRS based on the default TA value without using Offset_TA, but the UE may determine a DL reference timing with respect to a cell that transmits a DL signal having the shortest arrival time rather than the serving cell.

If there is no special configuration as described above, the UE may determine the DL reference timing with respect to a cell that transmits a DL signal having the shortest arrival time among all cells detected by the UE. However, when the BS/LMF/location server preconfigures cells that receive the UL-PRS/SRS or configures such cells for the UE through physical and/or higher layers, the UE may derive the DL reference timing with respect to a cell that transmits a DL signal having the shortest arrival time among the configured cells. Further, to improve reliability, the UE may determine the DL reference timing with respect to a cell that transmits a DL signal having the shortest arrival time among cells of which the reception quality is within a predetermined threshold with respect to a cell having the best reception quality. In this case, the predetermined threshold may be predefined or configured by higher and/or physical layers. Additionally, the UE may report information about the cell corresponding to the reference for determining the DL reference timing to the BS/LMF/location server in order for the BS/LMF/location server to calculate the RTT for a specific cell.

The UE may obtain the TA value and transmit the UL-PRS/SRS based on the TA Value according to at least one of the above-described methods. However, in this case, there may be a collision between the UL-PRS/SRS and UL signals allocated after or before resources for the UL-PRS/SRS. Thus, the BS/LMF/location server needs to properly configure UL resources in the time domain so that the collision does not occur as much as possible.

When the UL-PRS/SRS collides with other UL signals/channels, a rule for dropping transmission of any one signal may be configured based on the signal priority. Since the UL-PRS/SRS is not a signal that is transmitted to only one cell, and resources allocated for the UL-PRS/SRS may be delayed and received, the BS/LMF/location server may configure a time gap after the UL-PRS/SRS to prevent a collision between the UL-PRS/SRS and other UL signals/channels.

To this end, the time gap may be determined as a period in which no UL-PRS/SRS is transmitted within the resource period where the UL-PRS/SRS is repeated and allocated N times as described in Embodiment 1. Alternatively, the time gap may be configured after OFDM symbols allocated for the UL-PRS/SRS. In this case, the time gap configured after the OFDM symbols may be determined by reflecting a maximum distance supported for the UL-PRS/SRS. In addition, even if a UL signal/channel is allocated to the time gap, the UE may not transmit the UL signal/channel in the corresponding time gap period. In addition, when a non-zero Offset_TA value is applied to the TA value configured by the serving cell, the BS may configure the time gap period before the OFDM symbols to which the UL-PRS/SRS is allocated, and may not allocate any resources for other UL signals/channels at least in the same frequency band within the corresponding gap period.

The BS/LMF/location server may indicate or configure at least one TA value to the UE in relation to a beam direction in which the UE transmits the UL-PRS/SRS. In addition, the UE may be configured or instructed to transmit the UL-PRS/SRS on a specific Tx beam to at least one TP/BS.

Even if the UE is incapable of recognizing which cell/BS receives the UL-PRS/SRS transmitted on the specific Tx beam, the BS/LMF/location server may indicate or configure at least one TA value to the UE in relation to a Tx beam for the UE transmit the UL-PRS/SRS for the purpose of positioning of the UE.

For example, the BS/LMF/location server may indicate or configure the TA value for each UL-PRS/SRS resource and/or each UL-PRS/SRS resource set. That is, the BS/LMF/location server may indicate or configure the TA value to the UE in relation to a specific UL-PRS/SRS resource and/or a specific UL-PRS/SRS resource set.

The UE may autonomously determine or configure the TA value for the UL-PRS/SRS that is targeted and transmitted to a specific cell/BS/TP. In addition, the UE may determine or configure the TA value by itself even when the UE transmits the UL-PRS/SRS in all directions regardless of Tx beams.

For UTDOA operation, the UE may autonomously determine or configure the TA value for the UL-PRS/SRS for each TX beam. For example, the UE may determine or configure the TA value for each UL-PRS/SRS resource and/or each UL-PRS/SRS resource set.

To determine or configure the TA value for the UL-PRS/SRS that is targeted and transmitted to a specific cell/BS/TP, the UE may use a DL-PRS, an SS/PBCH block, and/or a CSI-RS. Here, the DL-PRS is a signal transmitted from a plurality of cells/BSs, and may mean an RS that is set to a dedicated RS for DL positioning. When the UE is configured with the DL-PRS, SS/PBCH block, and/or CSI-RS, the UE may receive configuration information for receiving the DL-PRS, SS/PBCH block, and/or CSI-RS from a neighbor cell as well as configuration information about a reference cell (e.g., serving cell).

The UE may calculate or estimate the TA value for the neighbor cell by using a TOA value measured based on the DL-PRS, SS/PBCH block, and/or CSI-RS transmitted from the neighbor cell with respect to TOA measured from the DL-PRS, SS/PBCH block, and/or CSI-RS transmitted from the serving cell or reference cell and the TA value configured by the serving cell or reference cell.

In this case, a specific BS/cell may transmit the DL-PRS, SS/PBCH block, and/or CSI-RS on a plurality of Tx beams. In addition, the TOA value may be measured based on a specific Tx beam used for the DL-PRS, SS/PBCH block, and/or CSI-RS. In addition, the UE may calculate or determine TA values for a UL-PRS/SRS resource and/or a UL-PRS/SRS resource set associated with an Rx beam used by the UE to receive the DL-PRS, SS/PBCH block, and/or CSI-RS transmitted on the specific Tx beam.

The BS/LMF/location server may instruct the UE to perform the above-described UE operation. In addition, the BS/LMF/location server may instruct the UE to transmit the UL-PRS/SRS to a specific neighbor cell/BS/TP.

The above-described SRS resource and/or SRS resource set may be set to a dedicated SRS used only for UE positioning. For example, the SRS resource set or an SRS resource group obtained by grouping a plurality of SRS resource sets into one group may be configured by a higher layer configuration parameter. The UE may recognize that the configured SRS resource set or SRS resources included in the SRS resource group are used for UTDOA.

For example, a configuration value available for UE positioning may be defined by the SRS resource set configuration parameter 'SRS-SetUse' of 3GPP TS 38.331. For example, when SRS-SetUse is set to UTDOA, the UE may recognize that corresponding SRS resources are used for UE positioning.

Considering that the UE transmits the SRS to a plurality of cells/BSs by changing its Tx beam for UTDOA operation, only SRS resource(s) and SRS resource set(s) configured for BM may be limitedly used for the UTDOA operation. Therefore, the methods by which the UE/BS/LMF/location server determines the TA value may be limitedly applied only to SRS resources used for BM.

Additionally, the BS/LMF/location server may inform the UE whether to perform the operation described in Embodiment 2 such as "operation by which the UE autonomously configures/determines/uses the TA for a neighbor cell" and/or "operation by which the UE configures or determines the TA for each UL-PRS/SRS resource and/or each UL-PRS/SRS resource set".

For example, the higher layer parameter related to the corresponding operation may be indicated as "ON" or "OFF" to instruct the UE whether to perform the operation. If there are many neighbor cells and many SRS resources, the overhead of the UE may increase excessively. Thus, in this case, the BS/LMF/location server may instruct the UE not to report the TA value determined or calculated by the UE.

The measurement accuracy may be affected by the UE positioning scheme. For example, when a timing difference value (e.g., RSTD) such as UTDOA is used, the accuracy of UE positioning may not be significantly affected even if the UE reports no TA value. However, when the absolute distance is calculated by an RTT-based method, TOA needs to be measured. In this case, if the TA value is not reflected, an error as much as the TA value may occur.

Therefore, even if the BS/LMF/location server does not separately provide an indication or configuration to the UE, the UE may autonomously turn on or off the operation of configuring or determining the TA in conjunction with the UE positioning scheme. For example, when the location of the UE is measured based on the RSTD, the UE may autonomously turn off the operation of configuring or determining the TA value. When the location of the UE is measured based on the RTT, the UE may autonomously turn on the operation of configuring or determining the TA value. In other words, the operation by which the UE autonomously determines or configures the TA value may be implicitly indicated or configured to the UE according to the UE positioning scheme.

Embodiment 3: Power Control of UL-PRS/SRS

As described above, since a UL-PRS/SRS is received not only by a serving cell but also by neighboring cells, UL-PRS/SRS transmission power may need to be configured so that a neighboring cell configured to receive the UL-PRS/SRS is capable of receiving the UL-PRS/SRS. To this end, basically, the UL-PRS/SRS may be transmitted with maximum transmission power so that as many neighboring cells as possible are capable of detecting the UL-PRS/SRS. However, in this case, the UL-PRS/SRS transmitted with the maximum transmission power may act as a strong interference signal to the UL-PRS/SRS of another UE multiplexed on the same resource, and thus the performance of positioning may be significantly degraded. In addition, the UL-PRS/SRS may act as strong interference to the BS that receives no UL-PRS/SRS, thereby decreasing the reception rate of UL signals.

Therefore, there is a need for a method of properly configuring the transmission power of the UL-PRS/SRS.

(1) Embodiment 3-1

Among cells detectable by the UE, a cell having the lowest reception power is selected as a reference cell for path loss measurement. In other words, instead of determining the serving cell as the reference cell for path loss measurement, the cell having the lowest reception power among the cells detectable by the UE including the serving cell may be determined as the reference cell for pathloss measurement. Specifically, when the path loss is measured based on the cell having the lowest reception power and the UE determines the power of the UL-PRS/SRS based on the path loss, all cells detected by the UE may receive the UL-PRS/SRS transmitted by the UE. Here, the lowest reception power may mean that the reception quality is the worst.

In this case, an RS for measuring reception power of detectable cells may be an SS/PBCH block and/or a DL-PRS. Since the number of RBs allocated for the DL-PRS is more than the number of RBs allocated for the SS/PBCH block, the UE may measure the DL-PRS in a wider range so that the UE detects cells in a wider range. That is, the SS/PBCH block has a smaller cell detection range than the DL-PRS. However, the DL-PRS may be transmitted by only a cell or BS configured to transmit the DL-PRS, whereas the SS/PBCH block may be transmitted by all BSs or cells so that the UE may detect all BSs or cells within a predetermined range.

When the UE determines the reference cell, the UE may determine as the reference cell a cell having the worst reception quality among cells of which the reception quality is within a predefined or predetermined threshold with respect to a cell having the best reception quality in order to guarantee the reliability of the selected reference cell, instead of selecting the reference cell from among all cells detectable by the UE.

When the BS informs the UE of a list of cells that will receive the UL-PRS/SRS, the UE may select as the reference cell a cell having the lowest reception power among cells included in the cell list. If only one cell is included in the cell list transmitted by the BS, the corresponding cell may be directly set to the reference cell.

The cell list may be configured by an RRC parameter, or provided by DCI or a medium access control (MAC) control element (CE) for triggering UL-PRS/SRS transmission.

(2) Embodiment 3-2

In the case of the UL-PRS/SRS, the serving cell may be set to the reference cell and path loss may be calculated based thereon as in other UL signals/channels. To allow neighboring cells located farther away from the UE than the serving cell to receive the UL-PRS/SRS, a predetermined offset value (hereinafter referred to as 'P0 value') may be configured. For example, P0_UL-PRS in Equation 5 below may be the P0 value.

$$P_{UL-PRS,c}(i) = \min\{P_{CMAX,c}(i), 10\log_{10}(M_{UL-PRS,c}) + P_{0\_UL-PRS,c}(m) + \alpha_{UL-PRS,c} \cdot PL_c + f_{UL-PRS,c}(i)\}[dBm] \quad \text{[Equation 5]}$$

In Equation 5, $P_{UL-PRS,c}(i)$ denotes the power of the UL-PRS/SRS, and $P_{CMAX,c}(i)$ denotes the maximum power output by the UE for serving cell c in UL-PRS/SRS transmission occasion i. In addition, $M_{UL-PRS,c}(i)$ is a UL-PRS/SRS bandwidth expressed in the number of RBs for SRS transmission occasion i, $\alpha_{UL-PRS,c}$ is a coefficient for the path loss, and $PL_{,c}$ is a DL pathloss estimate in dB.

For the P0 value, the same transmission power parameters as those for the SRS or RACH signal may be used. However, an additional offset value may be configured for the UL-PRS or SRS for positioning. According to this configuration, the UL-PRS/SRS may be received by a neighboring cell having pathloss corresponding to the additional offset value compared to the serving cell. Therefore, when the BS configures the above-described additional offset value and/or UL-PRS/SRS transmission power control parameter, the BS may configure the corresponding additional offset and/or UL-PRS/SRS transmission power control parameter based on an RRM report and/or DL-PRS report for the neighboring cell. The additional offset and/or UL-PRS/SRS transmission power control parameter may be configured by RRC signaling when UL-PRS SRS resources are configured. Alternatively, the additional offset and/or UL-PRS/SRS transmission power control parameter may be provided by DCI and/or MAC CE when the UL-PRS/SRS transmission is triggered.

(3) Embodiment 3-3

To allow as many cells as possible to receive the UL-PRS/SRS, no UL resources may be configured so that all neighboring cells perform muting of other UL signals at the UL-PRS/SRS transmission timing, or UL transmission may be restricted on the corresponding resources. In this case, the BS may directly configure transmission power based on UL-PRS/SRS coverage. That is, in the case of the UL-PRS/SRS, transmission parameters related to the transmission frequency band of the UL-PRS/SRS, the resource mapping method of the UL-PRS/SRS, etc. are not different but the same for each cell. Thus, when the UL-PRS/SRS is configured, the transmission power of the UL-PRS/SRS may be configured by reflecting only the coverage depending on the channel characteristics of the UL-PRS/SRS. In other words, if the UL-PRS/SRS is transmitted over a certain range of coverage, the BS may configure the transmission power of the UL-PRS/SRS by considering whether the positioning accuracy of the UE is higher than a prescribed level.

Meanwhile, if the UE is capable of using a plurality of Tx/Rx beams, the UE may transmit the UL-PRS/SRS on a plurality of Tx beams. This may be interpreted to mean that a plurality of UL-PRS/SRS resources are allocated in terms of actual resource allocation. For example, a UL-PRS/SRS resource and/or a UL-PRS/SRS resource set may be configured for each of the plurality of Tx beams.

When the UL-PRS/SRS is transmitted on the plurality of Tx beams via UL-PRS/SRS resources and/or UL-PRS/SRS resource sets, a different cell or BS may be associated with each of the UL-PRS/SRS resources and/or UL-PRS/SRS resource sets. For example, a UL-PRS/SRS resource and/or a UL-PRS/SRS resource set may be configured for each cell or BS.

For example, it is assumed that the BS designates cells/BSs #10, #20, #30, and #40 as cells that will receive the UL-PRS/SRS and that the UE uses two Tx/Rx beams. In addition, it is assumed that Rx beam #1 is associated with Tx beam #1, and Rx beam #2 is associated with Tx beam #2. Further, it is assumed that cells/BSs #10 and #20 have higher reception strength in Rx beam #1 and cells/BSs #30 and #40 have higher reception strength in Rx beam #2. If the first UL-PRS/SRS resource or the first UL-PRS/SRS resource set is associated with Tx beam #1, cells/BSs #10 and #20 may be advantageous for receiving the UL-PRS/SRS on the first UL-PRS/SRS resource or the first UL-PRS/SRS resource set. In Embodiment 3-1, when a reference cell/BS for configuring transmission power is determined, only cells/BSs #10 and #20 may be considered. Similarly, when the second UL-PRS/SRS resource or the second UL-PRS/SRS resource set is associated with Tx beam #2, the transmission power may be determined by considering only cells/BSs #30 and #40 in selecting the reference cell/BS.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 19:
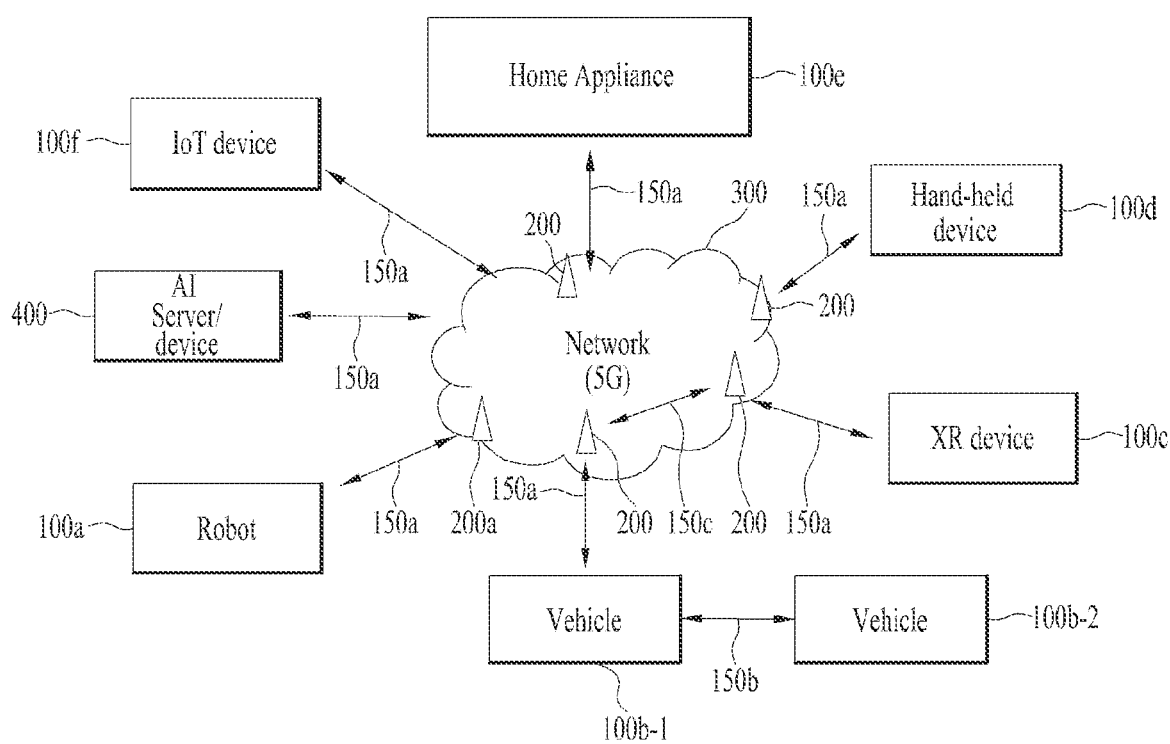
FIGS. 19 to 22 illustrate examples of various wireless devices to which embodiments of the present disclosure are applied.

FIG. 19 illustrates a communication system 1 applied to the present disclosure.

Referring to FIG. 19, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 20:
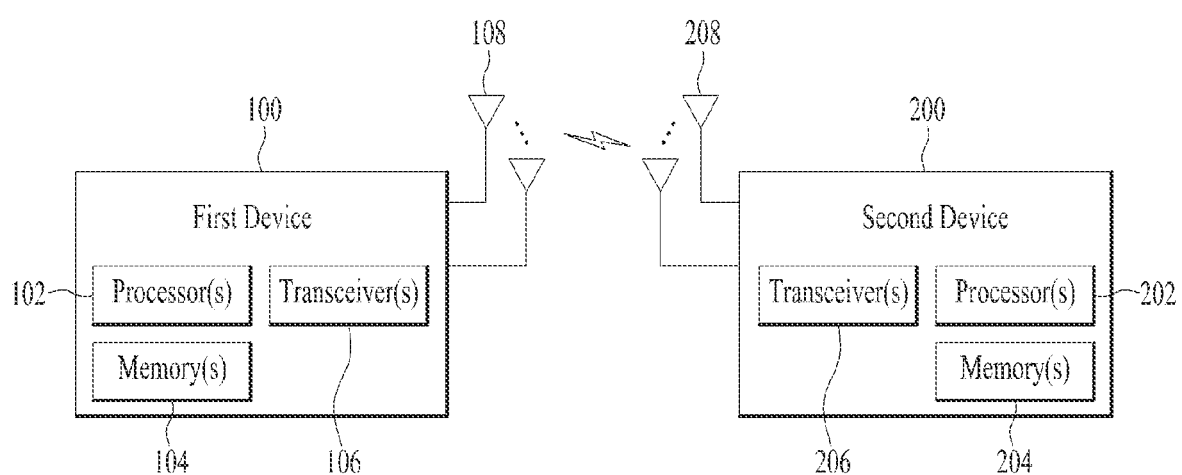

FIG. 20 illustrates wireless devices applicable to the present disclosure.

Referring to FIG. 20, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Hereinafter, a description will be given of instructions and/or operations controlled by the processor(s) 102 and stored in the memory(s) 104 of the first wireless device 100 according to an embodiment of the present disclosure.

While the following operations are described in the context of control operations of the processor(s) 102 from the perspective of the processor(s) 102, software code for performing the operations may be stored in the memory(s) 104.

The processor(s) 102 may control the transceiver(s) 106 to receive information about a UL-PRS/SRS configuration from the second wireless device 200 and/or a location server.

The processor(s) 102 may control the transceiver(s) 106 to receive an RS for determining the TA value and/or power of a UL-PRS/SRS from the second wireless device 200. In this case, the RS may be an SS/PBCH block and/or a DL-PRS. The TA value and/or power of the UL-PRS/SRS may be determined based on the RS according to Embodiments 2 and 3.

The processor(s) 102 may control the transceiver(s) 106 to transmit the UL-PRS/SRS based on the determined TA value and/or power of the UL-PRS/SRS. In this case, the format of the UL-PRS/SRS transmitted under control of the processor(s) 102 may be determined according to Embodiment 1.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Hereinafter, a description will be given of instructions and/or operations controlled by processor(s) 202 and stored in memory(s) 204 of the second wireless device 200 according to an embodiment of the present disclosure.

While the following operations are described in the context of control operations of the processor(s) 202 from the perspective of the processor(s) 202, software code for performing the operations may be stored in the memory(s) 204.

The processor(s) 202 may control the transceiver(s) 206 to transmit information on a UL-PRS/SRS configuration to the first wireless device 100. If the location server 90 of FIG. 23 transmits the UL-PRS/SRS configuration information to the first wireless device 100, the processor(s) 202 may drop the transmission of the UL-PRS/SRS configuration information to the first wireless device 100. In addition, the UL-PRS/SRS configuration information may be information transmitted from the location server 90 of FIG. 23 to the processor(s) 202. In this case, the processor(s) 202 may control the transceiver(s) 206 to forward the UL-PRS/SRS configuration information received from the location server 90 of FIG. 23 to the first wireless device 100.

The processor(s) 202 may control the transceiver(s) 206 to transmit an RS for determining the TA value and/or power of a UL-PRS/SRS to the first wireless device 100. In this case, the RS may be an SS/PBCH block and/or a DL-PRS. The TA value and/or power of the UL-PRS may be determined based on the RS according to Embodiments 2 and 3.

The processor(s) 202 may control the transceiver(s) 206 to receive the UL-PRS/SRS from the first wireless device 100 based on the determined TA value and/or power of the UL-PRS/SRS. In this case, the format of the UL-PRS/SRS transmitted by the first wireless device 100 may be determined according to Embodiment 1.

The processor(s) 202 may control the transceiver(s) 206 to transmit information related to positioning to the location server 90 of FIG. 23. In this case, the processor(s) 202 may directly measure the location of the first wireless device 100 and transmit the measured value to the location server 90 of FIG. 23. On the other hand, the processor(s) 202 may transmit RSTD, TOA, and/or AOA information measured based on the UL-PRS/SRS or values for calculating the RSTD, TOA, and/or AOA information to the location server 90 of FIG. 23, instead of directly measuring the location of the first wireless device 100. Then, the location server 90 of FIG. 23 may calculate the accurate location of the first wireless device 100

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 21:
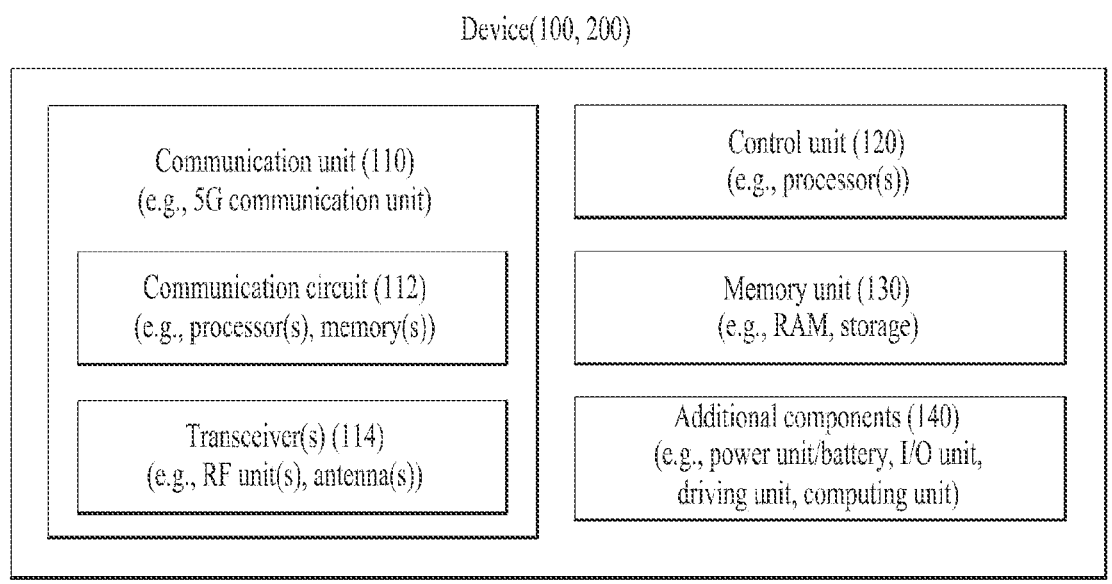

FIG. 21 illustrates another example of a wireless device applied to the present disclosure. The wireless device may be implemented in various forms according to a use case/service (refer to FIG. 19).

Referring to FIG. 21, wireless devices 100 and 200 may correspond to the wireless devices 100 and 200 of FIG. 21 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcasting terminal, a hologram device, a public safety device, an MTC device, a medical device, a FinTech device (or a finance device), a security device, a climate/environment device, the AI server/device (400 of FIG. 19), the BSs (200 of FIG. 19), a network node, or the like. The wireless device may be mobile or fixed according to a use case/service.

In FIG. 21, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

The implementation example of FIG. 21 will hereinafter be described with reference to the attached drawings.

Figure 22:
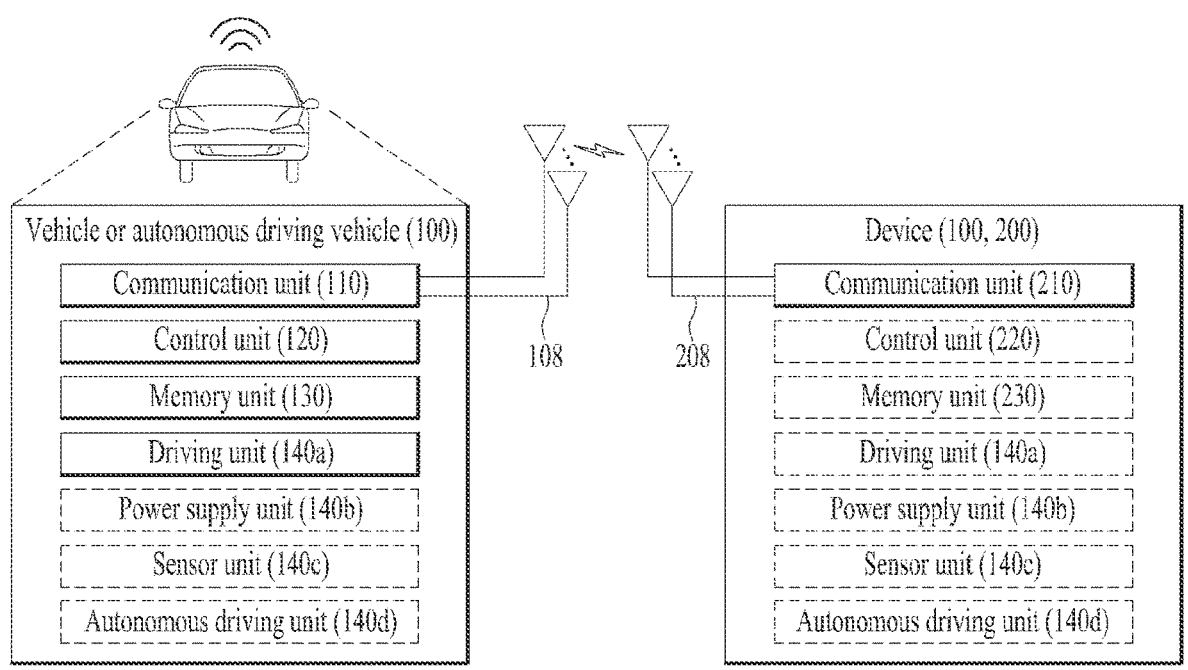

FIG. 22 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140*a* to 140*d* correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140*a* may enable the vehicle or the autonomous driving vehicle 100 to drive on a road. The driving unit 140*a* may include an engine, a motor, a powertrain, a wheel, a brake, a steering device, and so on. The power supply unit 140*b* may supply power to the vehicle or the autonomous driving vehicle 100 and include a wired/wireless charging circuit, a battery, and so on. The sensor unit 140*c* may acquire information about a vehicle state, ambient environment information, user information, and so on. The sensor unit 140*c* may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140*d* may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140*d* may generate an autonomous driving route and a driving plan from the obtained data. The control unit 120 may control the driving unit 140*a* such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140*c* may obtain information about a vehicle state and/or surrounding environment information. The autonomous driving unit 140*d* may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

To transmit and receive a UL-PRS/SRS and estimate a location based on the UL-PRS/SRS, the location server 90 shown in FIG. 23 may be provided. The location server 90 may be logically or physically connected to a wireless device 70 and/or a network node 80. The wireless device 70 may be the first wireless device 100 of FIG. 20 and/or the wireless device 100 or 200 of FIG. 21. The network node 80 may be the second wireless device 100 of FIG. 20 and/or the wireless device 100 or 200 of FIG. 21.

The location server 90 may be, without being limited to, an AMF, an LMF, an E-SMLC, and/or an SLP and may be any device only if the device serves as the location server 90 for implementing the embodiments of the present disclosure. Although the location server 90 is referred to as a location server for convenience of description, the location server 90 may be implemented not as a server but as a chip. Such a chip may be implemented to perform all functions of the location server 90 which will be described below.

Specifically, the location server 90 includes a transceiver 91 for communicating with one or more other wireless devices, network nodes, and/or other elements of a network. The transceiver 91 may include one or more communication interfaces. The transceiver 91 communicates with one or more other wireless devices, network nodes, and/or other elements of the network connected through the communication interfaces.

The location server 90 includes a processing chip 92. The processing chip 92 may include at least one processor, such as a processor 93, and at least one memory device, such as a memory 94.

The processing chip 92 may control one or more processes to implement the methods described in this specification and/or embodiments for problems to be solved by this specification and solutions to the problems. In other words, the processing chip 92 may be configured to perform at least one of the embodiments described in this specification. That is, the processor 93 includes at least one processor for performing the function of the location server 90 described in this specification. For example, one or more processors may control the one or more transceivers 91 of FIG. 24 to transmit and receive information.

The processing chip 92 includes a memory 94 configured to store data, programmable software code, and/or other information for performing the embodiments described in this specification.

In other words, in the embodiments according to the present specification, when the memory 94 is executed by at least one processor such as the processor 93, the memory 94 allows the processor 93 to perform some or all of the processes controlled by the processor 93 of FIG. 23 or stores software code 95 including instructions for performing the embodiments described in this specification.

Specifically, instructions and/or operations, which are controlled by the processor 93 of the location server 90 and are stored in the memory 94, according to an embodiment of the present disclosure will now be described.

While the following operations will be described in the context of a control operation of the processor 93 from the perspective of the processor 93, software code for performing these operations may be stored in the memory 94.

The processor 93 may control the transceiver 91 to transmit information on a UL-PRS/SRS configuration. In addition, the processor 93 may control the transceiver 91 to transmit the UL-PRS/SRS configuration information to the first wireless device 100 or second wireless device 200 of FIG. 20. If the processor 93 transmits the UL-PRS/SRS configuration information to the second wireless device 200 of FIG. 20, the second wireless device 200 of FIG. 20 may forward the corresponding information to the first wireless device 200 of FIG. 20.

The processor 93 may control the transceiver 91 to receive information related to positioning of the first wireless device 100 of FIG. 20 from the second wireless device 200 of FIG. 20. In this case, the corresponding information may be information about the location of the first wireless device 100 of FIG. 20, which is directly measured by the second wireless device 200 of FIG. 20. On the other hand, the information may be RSTD, TOA, and/or AOA information measured based on the UL-PRS/SRS or values for calculating the RSTD, TOA, and/or AOA information.

If the corresponding information is the RSTD, TOA, and/or AOA information measured based on the UL-PRS/SRS or the values for calculating the RSTD, TOA, and/or AOA information, the processor 93 may directly calculate and obtain the location of the first wireless device of FIG. 20.

Figure 24:
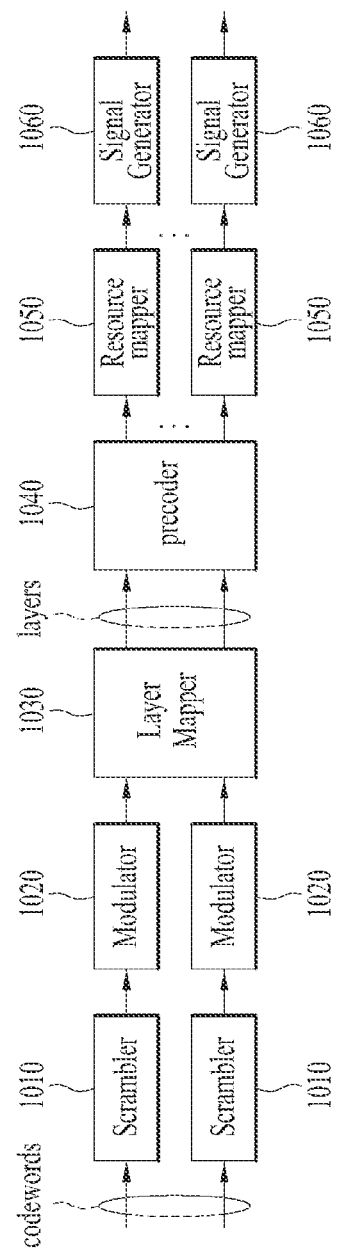
FIG. 24 illustrates an exemplary signal processing circuit to which embodiments of the present disclosure are applied.

FIG. 24 illustrates a signal processing circuit for transmission (Tx) signals.

Referring to FIG. 24, a signal processing circuit 1000 may include a scrambler 1010, a modulator 1020, a layer mapper 1030, a precoder 1040, a resource mapper 1050, and a signal generator 1060. The operations/functions shown in FIG. 24 may be performed by the processors 102 and 202 and/or the transceivers 106 and 206 shown in FIG. 19, without being limited thereto. Hardware elements shown in FIG. 19 may be implemented by the processors 102 and 202 and/or the transceivers 106 and 206 shown in FIG. 19. For example, the blocks 1010 to 1060 may be implemented by the processors 102 and 202. In addition, the blocks 1010 to 1050 may be implemented by the processors 102 and 202 shown in FIG. 19, and the block 1060 may be implemented by the transceivers 106 and 206 shown in FIG. 19.

The codeword may be converted into a radio signal (or a radio frequency (RF) signal) through the signal processing circuit 1000 shown in FIG. 24. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK(pi/2-Binary Phase Shift Keying), m-PSK(m-Phase Shift Keying), m-QAM(m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (N×M) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an inverse fast Fourier transform (IFFT) module, a cyclic prefix (CP) inserter, a digital-to-analog converter (DAC), a frequency uplink converter, etc.

The signal processing steps for reception (Rx) signals in the wireless device may be arranged in the reverse order of the signal processing steps 1010 to 1060 shown in FIG. 25. For example, the wireless devices 100 and 200 (shown in FIG. 20) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'mobile station (MS)', 'mobile subscriber station (MSS)', 'mobile terminal', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

While the method of transmitting and receiving an uplink reference signal for positioning and device therefor have been described based on the fifth generation (5G) new radio access technology (RAT), the method and device are also applicable to various wireless communication systems as well as the 5G new RAT.

What is claimed is:

1. A method for transmitting an Uplink (UL)—Reference Signal (RS) for positioning by a user equipment (UE) in a wireless communication system, the method comprising:
   receiving (i) first information related to a downlink (DL)-RS associated with the UL-RS and (ii) second information related to a neighbor cell, which transmits the DL-RS, among a plurality of cells;
   receiving, from the neighbor cell, the DL-RS; and
   transmitting, to a serving cell among the plurality of cells, the UL-RS based on the DL-RS,
   wherein a transmission power of the UL-is determined based on the DL-RS received from the neighbor cell.

2. The method of claim 1, wherein the first information and the second information are used to calculate a value related to path-loss.

3. The method of claim 1, wherein the UE is communicable with at least one of a UE other than the UE, a network, a base station (BS), or an autonomous driving vehicle.

4. A non-transitory medium which is readable by a processor and storing instructions that cause the processor to perform the method of claim 1.

5. A user equipment (UE) for transmitting an Uplink (UL)—Reference Signal (RS) for positioning in a wireless communication system, the UE comprising:
   at least one transceiver;
   at least one processor; and
   at least one computer memory operably connectable to the at least one processor and storing instructions that, when executed by the at least one processor, perform operations comprising:
   receiving, via the at least one transceiver, (i) first information related to a downlink (DL)-RS associated with the UL-RS and (ii) second information related to a neighbor cell, which transmits the DL-RS, among a plurality of cells;
   receiving, from the neighbor cell via the at least one transceiver, the DL-RS; and
   transmitting, to a serving cell among the plurality of cells, via the at least one transceiver, the UL-RS based on the DL-RS,
   wherein a transmission power of the UL-RS is determined based on the DL-RS received from the neighbor cell.

6. The UE of claim 5, wherein the first information and the second information are used to calculate a value related to path-loss.

7. The UE of claim 5, wherein the UE is communicable with at least one of a UE other than the UE, a network, a base station (BS), or an autonomous driving vehicle.

8. An apparatus for transmitting an Uplink (UL)—Reference Signal (RS) for positioning in a wireless communication system, the apparatus comprising:
   at least one processor; and
   at least one computer memory operably connectable to the at least one processor and storing instructions that, when executed by the at least one processor, perform operations comprising:
   receiving (i) first information related to a downlink (DL)-RS associated with the UL-RS and (ii) second information related to a neighbor cell, which transmits the DL-RS, among a plurality of cells;
   receiving, from the neighbor cell, the DL-RS; and
   transmitting, to a serving cell among the plurality of cells, the UL-RS based on the DL-RS,
   wherein a transmission power of the UL-RS is determined based on the DL-RS received from the neighbor cell.

* * * * *